United States Patent
Tziovaras et al.

(10) Patent No.: US 9,658,595 B2
(45) Date of Patent: May 23, 2017

(54) SECURITY DOCUMENT AND/OR DOCUMENT OF VALUE CONTAINING A VISUALLY CHANGEABLE WINDOW WITH A HOLOGRAM

(71) Applicant: Bayer MaterialScience AG, Leverkusen (DE)

(72) Inventors: Georgios Tziovaras, Wuppertal (DE); Heinz Pudleiner, Krefeld (DE); Kira Planken, Goch (DE); Stefan Janke, Brüggen (DE); Marc-Stephan Weiser, Leverkusen (DE); Thomas Fäcke, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 6 days.

(21) Appl. No.: 14/422,768

(22) PCT Filed: Aug. 15, 2013

(86) PCT No.: PCT/EP2013/067075
§ 371 (c)(1),
(2) Date: Feb. 20, 2015

(87) PCT Pub. No.: WO2014/029686
PCT Pub. Date: Feb. 27, 2014

(65) Prior Publication Data
US 2015/0220057 A1   Aug. 6, 2015

(30) Foreign Application Priority Data
Aug. 23, 2012   (EP) .................................. 12181440

(51) Int. Cl.
G03H 1/02   (2006.01)
G03H 1/00   (2006.01)
(Continued)

(52) U.S. Cl.
CPC ......... *G03H 1/0011* (2013.01); *B32B 37/142* (2013.01); *B32B 37/185* (2013.01);
(Continued)

(58) Field of Classification Search
None
See application file for complete search history.

(56) References Cited

U.S. PATENT DOCUMENTS 4,425,161 A * 1/1984 Shibahashi ............ B41M 5/282
106/31.17
4,677,285 A * 6/1987 Taniguchi .............. G06K 19/16
235/457

(Continued)

FOREIGN PATENT DOCUMENTS

DE   1964834 A1   7/1971
EP   0223587 A1   5/1987
(Continued)

OTHER PUBLICATIONS

Machine translation of JP 2011-248014 (2011).*
International Search Report for PCT/EP2013/067075 mailed Nov. 6, 2013.

*Primary Examiner* — Martin Angebranndt
(74) *Attorney, Agent, or Firm* — Drinker Biddle & Reath LLP

(57) ABSTRACT

The present invention relates to a security document and/or document of value with a hologram in a visually changeable window as a novel security element, and also to a method for producing the same.

13 Claims, 6 Drawing Sheets

(51) Int. Cl.
| | | |
|---|---|---|
| *G11B 7/24044* | (2013.01) | |
| *B42D 25/42* | (2014.01) | |
| *B42D 25/29* | (2014.01) | |
| *B42D 25/328* | (2014.01) | |
| *B32B 37/14* | (2006.01) | |
| *B32B 37/18* | (2006.01) | |
| *B32B 38/00* | (2006.01) | |
| *B32B 38/04* | (2006.01) | |
| *B42D 25/455* | (2014.01) | |
| *B42D 25/46* | (2014.01) | |
| *B42D 25/475* | (2014.01) | |

(52) U.S. Cl.
CPC .......... *B32B 38/0004* (2013.01); *B32B 38/04* (2013.01); *B42D 25/29* (2014.10); *B42D 25/328* (2014.10); *B42D 25/42* (2014.10); *G03H 1/02* (2013.01); *G03H 1/0248* (2013.01); *G03H 1/0252* (2013.01); *G03H 1/0256* (2013.01); *G11B 7/24044* (2013.01); *B32B 2038/042* (2013.01); *B32B 2307/40* (2013.01); *B32B 2307/412* (2013.01); *B32B 2307/416* (2013.01); *B32B 2398/20* (2013.01); *B32B 2554/00* (2013.01); *B42D 25/455* (2014.10); *B42D 25/46* (2014.10); *B42D 25/475* (2014.10); *B42D 2033/04* (2013.01); *B42D 2033/08* (2013.01); *B42D 2033/14* (2013.01); *B42D 2033/22* (2013.01); *B42D 2033/30* (2013.01); *G03H 2001/0016* (2013.01); *G03H 2001/0264* (2013.01); *G03H 2210/63* (2013.01); *G03H 2250/12* (2013.01); *G03H 2250/33* (2013.01); *G03H 2250/37* (2013.01); *G03H 2260/12* (2013.01); *G03H 2260/52* (2013.01); *Y10T 156/10* (2015.01); *Y10T 156/108* (2015.01)

(56) References Cited

U.S. PATENT DOCUMENTS

| | | | |
|---|---|---|---|
| 5,481,002 A | 1/1996 | Fischer et al. | |
| 6,482,489 B1* | 11/2002 | Otaki | G03H 1/0248 428/195.1 |
| 6,616,190 B1* | 9/2003 | Jotcham | D21H 21/48 283/109 |
| 6,822,769 B1* | 11/2004 | Drinkwater | G03H 1/0011 283/86 |
| 8,361,678 B2 | 1/2013 | Weiser et al. | |
| 2006/0005918 A1* | 1/2006 | Azakami | B31D 1/021 156/230 |
| 2010/0037326 A1* | 2/2010 | Batistatos | G07D 7/0013 726/34 |
| 2010/0194093 A1* | 8/2010 | MacPherson | B42D 25/355 283/94 |
| 2011/0236803 A1* | 9/2011 | Weiser | G03F 7/001 430/2 |
| 2011/0248224 A1 | 10/2011 | Lucht et al. | |
| 2012/0286504 A1* | 11/2012 | Oikawa | G03H 1/0252 283/85 |
| 2013/0113201 A1* | 5/2013 | Endres | B32B 27/08 283/86 |
| 2014/0295329 A1* | 10/2014 | Weiser | G11B 7/2542 430/2 |
| 2015/0017353 A1* | 1/2015 | Weiser | G03H 1/265 428/29 |

FOREIGN PATENT DOCUMENTS

| | | | |
|---|---|---|---|
| EP | 608019 A1 | | 7/1994 |
| EP | 608078 | * | 7/1994 |
| EP | 0613889 A2 | | 9/1994 |
| EP | 2172503 A1 | | 4/2010 |
| GB | 1057018 A | | 2/1967 |
| GB | 2347646 A | | 9/2000 |
| JP | 03-248188 | * | 11/1991 |
| JP | 03-248189 | * | 11/1991 |
| JP | 08-076674 | * | 3/1996 |
| JP | 2011-248014 | * | 12/2011 |
| JP | 2012008313 A | | 1/2012 |
| JP | 2012008315 A | | 1/2012 |
| WO | WO-2005121450 A1 | | 12/2005 |
| WO | WO-2006131465 A1 | | 12/2006 |
| WO | WO-2007085636 A1 | | 8/2007 |
| WO | WO-2007147843 A2 | | 12/2007 |
| WO | 2011/090030 | * | 7/2011 |
| WO | 2012/022413 | * | 2/2012 |

* cited by examiner

SECURITY DOCUMENT AND/OR DOCUMENT OF VALUE CONTAINING A VISUALLY CHANGEABLE WINDOW WITH A HOLOGRAM

CROSS-REFERENCE TO RELATED APPLICATIONS

This application is a national stage application (under 35 U.S.C. §371) of PCT/EP2013/067075, filed Aug. 15, 2013, which claims benefit of European Application No. 12181440.4, filed Aug. 23, 2012, both of which are incorporated herein by reference in their entirety.

The present invention relates to a document of security and/or value having a hologram in a visually switchable window as an innovative security element, and to a method for producing it.

Within the market for documents of security and/or value, more particularly documents of identification (ID documents), the demand exists for continual improvement in the safety features used, and also for the development of new safety features in order to keep one step ahead of potential forgers at all times. The security features ought to be such that a forgery is technically difficult and in purely visual terms is extremely easy to identify.

Plastics-based documents of security and/or value, more particularly documents of identification, such as ID cards, for example, are nowadays preferably produced in the form of multilayer assemblies, without the use of layers of adhesive, by means of lamination at high temperatures and high pressure, in order to prevent subsequent separation of the layer construction for the purpose of switching of identification features. Incorporated into these multilayer assemblies before or during the laminating operation are the corresponding security features which, consequently, must be of a kind such that they withstand the parameters of the laminating operation without suffering destruction. Moreover, the security features must not introduce any weak points into the multilayer assembly that, again, would enable subsequent opening of the assembly without destruction.

Security features in documents of security and/or value are typically divided into three security grades:

Grade 1 security features are those which are perceptible purely visually, without use of additional auxiliary means.

Grade 2 security features are those which will require auxiliary means (such as, for example, a magnifying glass, an optical filter, a reading device, etc.) to become visible.

Grade 3 security features are those which can be identified only in a laboratory, by means of forensic methods. This analysis usually entails at least partial destruction of the document.

Grade 1 security features, while they can be perceived rapidly, are nevertheless disadvantageous in that adequate forgeries can be produced with limited cost and effort.

Grade 3 security features can be forged only with extremely high cost and effort, but for their identification an at least partial destruction of the secure document is generally unavoidable.

To an increased extent, therefore, there is demand for security features which can be assigned at least partly to Grade 2, since these features do not have the aforementioned disadvantages.

The use of holograms in documents of security and/or value has for many years been a popular means of increasing the forgeproofness of these documents. The holograms here are typically adhered to the documents by means of hot embossing. To a large extent, the holograms used are embossed holograms which are provided on their reverse face with a heat-activatable adhesive. During the hot embossing operation, the adhesive is activated by the heat of the embossing die, and the hologram joins to the document and can then be parted from its backing film.

Embossed holograms themselves are moulded into a thermoplastic in an embossing step from a precision mould (nickel shim). Surface holograms of this kind typically have an embossed thickness of less than one micrometer. The nature of these holograms, however, limits their light efficiency to around 30%, meaning that not more than 30% of the incident light is diffracted by the hologram in the direction of the viewer. For this reason, these holograms are usually subsequently metallized or actually embossed into metallized films in order to increase their visibility. Furthermore, these holograms display a "rainbow-like" polychromatic colour pattern. In order to increase the forgeproofness of the documents and the life of the holograms, holograms are also laminated into documents made of plastic. In that case the holograms are embossed onto the inner films, and then covered with transparent films in order to ensure their visibility.

More recently, furthermore, a new class of holograms have been used in security documents, being distinguished by their high optical efficiency (diffraction efficiency >90%) and by their uniform colouredness. These holograms are called volume holograms, since their diffractive structure has been written in the entire layer thickness (usually 10-20 µm). Volume holograms display a light-diffraction behaviour with a pronounced angular dependency. Accordingly, they are transparent at certain angles (off-Bragg) and clearly visible at others (on-Bragg).

To raise the security against forgeries further, certain documents of security and/or value, more particularly in card form, include in one place a transparent window, an example being the current Swedish driver's license. The security function of such a window is that, on any attempt to delaminate the card or open it in some other way, the film assembly in the transparent window is destroyed and a clouding or another visible defect comes about that is readily apparent from the lack of clarity in the window.

Furthermore, the prior art also describes documents of security and/or value that have an optically switchable layer in conjunction with holograms as a security feature. Optically switchable layers of this kind have been produced using thermochromic and/or photochromic materials.

The use of a photochromic effect in combination with volume holograms is known for example from Kim, Jeonghun; Kim, Eunkyoung, Proceedings of SPIE (2008), 7118 (Optical Materials in Defence Systems Technology V), 71180F/1-71180F/10. Publisher: Society of Photo-Optical Instrumentation Engineers, CODEN: PSISDG ISSN: 0277-786X. There, the colour pigment was added directly to the photopolymer. By means of UV exposure, the material became blue and the hologram became invisible. This served the purpose of showing that the hologram was written in authentic material and hence was not forged. The introduction of an additional chromophore into the photopolymer formulation, however, is extremely complicated, since said chromophore must be selected such that it causes destruction neither during exposure nor during the subsequent UV bleaching step.

The use of thermochromic materials in conjunction with embossed holograms for the purpose of enhanced authentication is known from applications JP 2012008313 A and JP 2012008315 A. Such holograms, however, are unsuitable for use in documents of security and/or value, owing to their low forgeproofness.

Consequently there continues to be demand for new and improved security features in documents of security and/or value, more particularly for security features of a kind which not only are perceptible purely optically—and hence, in turn, easier to forge—but also, in addition, require auxiliary means for full exploitation of their security potential. Furthermore, the documents of security and/or value ought also to be easy to produce.

The object of the present invention, therefore was that of providing a document of sec and/or value having such a new and improved security feature.

This object has surprisingly been achieved by the incorporation into a document of security and/or value of a visually switchable window comprising a hologram, in which the hologram in one state is only poorly visible, and the window is virtually transparent, while in another state it is clearly apparent.

The present invention accordingly provides a document of security and/or value, comprising at least one window, the window being formed from a multilayer assembly, characterized in that the multilayer assembly has
at least one layer (P) comprising at least one photopolymer and incorporating at least one hologram (H) and
at least one transparent, optically switchable layer (O) which becomes non-transparent by means of heat or irradiation.

This window in the inventive document of security and/or value constitutes both a Grade 1 security feature, since the transparency of the window becomes clouded on any attempt at forgery, and a Grade 2 security feature, since the use of auxiliary means is required for the switching of the optically switchable layer.

The hologram (H) is preferably a volume hologram, more preferably a reflection hologram.

Preferred holograms of this kind have the advantage that on the basis of their angle-dependent light diffraction behaviour they are completely transparent at certain angles (off-Bragg), so that the window intrinsically appears completely transparent. At other angles, such holograms are then visible at least with sufficient distinctness that, as Grade 1 security features, they can be perceived at least visually without auxiliary means (on-Bragg).

An optically switchable layer (O) in the context of the invention means that when an auxiliary means is used, the layer (O) changes in such a way that it can be perceived distinctly with the naked eye from all viewing angles. The layer (O) is preferably switchable, by irradiation or exposure to heat, between completely transparent and a distinctly visible hologram with a preferably dark background, more preferably by exposure to UV radiation, heat or other radiation, very preferably by exposure to UV radiation or heat.

The layer (P) and the optically switchable layer (O) are preferably positioned in the window in such a way that they are located at the same place in the document and largely overlap in the viewing direction of a viewer—that is, exhibit a combined optical function.

The transparent, optically switchable layer (O) is preferably a layer comprising at least one photochromic and/or thermochromic material, and said material may consist of photochromic and/or thermochromic pigments, photochromic and/or thermochromic dyes, liquid-crystalline materials, thermochromic gels, or thermochromic paints or inks.

Photochromic materials change their light absorption properties with irradiation by UV light or visible light. With the change in light absorption properties on irradiation by infrared light (thermal radiation), substances are generally said to be thermochromic. Thermochromic substances, however, additionally comprise the systems which likewise change colour as a result of heating/cooling.

Examples of thermochromic inorganic substances contemplated include the following: 3d transition metal complexes, particularly those based on cobalt, copper or nickel, such as dichlorobisethanolcobalt(II), bis(dialkylamino)copper tetrachloride, dialkylaminocopper pentachloride, and also N,N-diethylethylenediamino 3d transition metal complexes such as M(N,N-diethylethylenediamine)2(x)2 with M=Cu or Ni and X=perchlorate or hexafluoroborate, tetramers of copper iodide-pyridine adducts such as Cu4I4(py)4, distilbenes with Sb—Sb bonding, dibismuthanes with Bi—Bi bonding, silver disulphide, mixed samarium lanthanum sulphides Sm(1-x)Ln(x)S, vanadium dioxide, and divanadium trioxide. Use may further be made of europium, terbium, gadolinium and neodymium complexes of trifluoroaceteonates, betadiketonates and benzoylacetonates.

Thermochromic and in some cases also simultaneously photochromic organic substances include those mentioned in K. Nassau "The Physics and Chemistry of Color", John Wiley & sons Inc., New York 1983, pp 77 ff. These include, for example, spiropyrans, spirooxazines, which are switchable between a colourless spiroheterocyclic form and a coloured merocyanin form; accordingly, for example, spiro[indoline-naphthopyran], spiro[indoline-naphthooxazine], spiro[indolino-quinoxazine], spiro[indoline-benzopyran], spiropyrans of 2-oxaindane, of azaindanone with chromenes, of 5',7'-dimethoxybenzooxazine; spiropyrans of dithiolane, and perimidine-spirocyclohexadienones.

Use may be made, further, of Schiff bases of salicylaldehydes, and aromatic amines, aminopyridines, aryl- and alkylthienylamines. Likewise suitable are also bianthrones, bianthrylidenes and other sterically hindered ethenes, such as, for example, dixantheneylidenes, bithioxanthrylidenes, 9,9'-fluorenylideneanthrones, 9-diphenylmethyleneanthrones, xanthylidenearithrones and (2-(thioxanthen-9-ylidene)indane-1,3-dione, indano[1,2-b]azirines, 4,6,7-tri (alkoxyphenyl)-1,2,5-thiadiazolo[3,4-c]pyridines, substituted bullvalenes and barbaralanes, 3,3-diaryl-3H-naphtho[2,1-b]pyrans, and 2,2-diaryl-2H-naphtho[1,2-b]pyrans;
azamethine dyes as in EP608019 A1 and described therein, dicyanophenylthio compounds as in EP0613889 A2 and described therein, disazo dyes as described in WO2007147843, beta-phenyl vinyl ketones and omega-phenyl polyacetyl vinyl ketones as described in WO2007085636, 6,11-dihydroxy-naphthacene-5,12-diones as described in WO2006131465, and polythiophenes as described in US2011248224, for example.

Likewise suitable are thermochromic compositions based on pH indicators which respond to a thermally induced pH change, in which case it is possible to utilize reversibly thermochromic leuco dyes, where a capsule which melts at a temperature forms the colour and on cooling is solidified again into such a capsule. Possible leuco dyes are, for example, spirolactones, fluorans (such as cosine), spiropyrans and fulgides. Suitable weak acids include phenols (bisphenol A), parabens, 1,2,3-triazoles and 4-hydroxycoumarins. It is likewise possible to provide gel-like systems with ph indicators which change colour on temperature change. Suitability in this context is possessed by polyvinyl alcohol/borax/surfactant or polyalkoxide/lithium chloride/(water) systems.

Thermochromic layer constructions based on liquid-crystal compositions may be applied by using pure liquid crystals, liquid crystal slurries or by microencapsulated liquid crystals.

It is particularly preferred if the optically switchable layer (O) comprises organic thermochromic substances, liquid-crystal compositions and compositions comprising pH indicator.

Examples of photochromic dyes contemplated include certain spiro compounds such as, for example, spiro[indoline-naphthooxazine], such as, for example, 1,3,3-trimethylspiro[indoline-2,3-[3H]-naphtho[2,1-b][1,4]oxazine (NISO), spiro[indolino-quinoxazine], spiro[indoline-naphthopyrans], spiro[indoline-benzopyran], especially 2-substituted adamantylpyran spiro compounds, spiro[1,8a]dihydroindolizines (DHIs), 6-nitro-1',3',3'-trimethylspiro[2H-]-benzopyran-2,2'indoline](6-nitro-BIPS), additionally fulgides (Aberchrome 540, Aberchrome 670, Aberchrome 850) and fulgimides, succinic anhydride and imide derivatives with substitution in 3-position by alkyl (ethylidene), benzyl, 3-furyl, 3-pyrryl, 3-thienyl. Benzofuranyl, indonyl, benzothienyl, with substitution in 4-position by alkyl (e.g. isopropylidene, adamantylidene). Additionally it is possible to utilize diarylethene (BTFTT), 2-H-chromene and its derivatives such as, for example, 2,2-diphenylchromene, 6,6-diphenylnaphtho(2,1:2,3)pyran-4-d, diarylnaphthopyrans, azobenzenes, and benzotriazoles such as, for example, 2-(2'-hydroxy-5'-methylphenyl)benzotriazole.

In preferred embodiments the transparent, optically switchable layer (O) is a layer of at least one transparent thermoplastic comprising at least one photochromic pigment or at least one photochromic dye, very preferably a photochromic pigment.

Transparent thermoplastics contemplated for the layer (O) include thermoplastics selected from polymers of ethylenically unsaturated monomers and/or polycondensates of difunctional reactive compounds.

Particularly suitable transparent thermoplastics are polycarbonates or copolycarbonates based on diphenols, polyacrylates or copolyacrylates and polymethacrylates or copolymethacrylates such as, by way of example and preferably, polymethyl methacrylate, polymers or copolymers with styrene such as, by way of example and preferably, transparent polystyrene or polystyrene-acrylonitrile (SAN), transparent thermoplastic polyurethanes, and also polyolefins, such as, by way of example and preferably, transparent polypropylene grades or polyolefins based on cyclic olefins (e.g. TOPAS®, Hoechst), polycondensates or copolycondensates of terephthalic acid or naphthalenedicarboxylic acid, such as, by way of example and preferably, poly- or copolyethylene terephthalate (PET or CoPET), glycol-modified PET (PETG) or poly- or copolybutylene terephthalate (PBT or CoPBT), poly- or copolyethylene naphthalate (PEN or CoPEN), or mixtures of the aforementioned.

Especially preferred as transparent thermoplastics for the layer (O) are thermoplastic polyurethanes.

Suitable thermoplastic polyurethanes (TPU) are prepared for example from linear polyols (macrodiols), such as polyester diols, polyether diols or polycarbonate diols, organic diisocyanates and optionally short-chain, usually difunctional alcohols (chain extenders). They may be prepared continuously or batchwise. The best-known preparation processes are the belt process (GB-A 1 057 018) and the extruder process (DE-A 19 64 834).

The transparent, optically switchable layer (O) more preferably is a layer of at least one transparent thermoplastic comprising at least one photochromic or thermochromic material or composition, very preferably of at least one transparent thermoplastic polyurethane comprising at least one photochromic or thermochromic material or composition.

Preferred thermoplastic polyurethanes for the layer K in the inventive document of security and/or value are reaction products of a) organic diisocyanates
b) polyester diols and/or polyether diols, preferably polyether diols, and
c) optionally chain extenders.

As diisocyanates a) it is possible to use aromatic, aliphatic, araliphatic, heterocyclic and cycloaliphatic diisocyanates or mixtures of these diisocyanates (cf. HOUBEN-WEYL "Methoden der organischen Chemie", volume E20 "Makromolekulare Stoffe", Georg Thieme Verlag, Stuttgart, N.Y. 1987, pp. 1587-1593 or Justus Liebigs Annalen der Chemie, 562, pages 75 to 136).

Specific examples that may be mentioned include the following: aliphatic diisocyanates, such as hexamethylene diisocyanate, cycloaliphatic diisocyanates, such as isophorone diisocyanate, 1,4-cyclohexane diisocyanate, 1-methyl-2,4-cyclohexane diisocyanate and 1-methyl-2,6-cyclohexane diisocyanate, and also the corresponding isomer mixtures, 4,4'-dicyclohexylmethane diisocyanate, 2,4'-dicyclohexylmethane diisocyanate and 2,2'-dicyclohexylmethane diisocyanate and also the corresponding isomer mixtures, aromatic diisocyanates, such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 1,2-bis(4-isocyanatophenyl)ethane and 1,5-naphthylene diisocyanate. The stated diisocyanates may be employed individually or in the form of mixtures with one another. They may also be used together with up to 15 weight % (calculated on the total amount of diisocyanate) of a polyisocyanate, examples being triphenylmethane 4,4',4"-triisocyanate or polyphenyl-polymethylene polyisocyanates.

Preference is given to using diisocyanates and polydiols which are reacted to give thermoplastic polyurethanes having extrusion temperatures of 190° C. or less.

It is also preferred if the thermoplastic polyurethanes are distinguished by high light fastness. The use is therefore preferred of aliphatic or cycloaliphatic diisocyanates and also aliphatic polydiols, more preferably polyether diols.

Preferred organic diisocyanates a) are aliphatic or cycloaliphatic diisocyanates such as hexamethylene diisocyanate, 2,2,5-trimethylene-hexamethylene diisocyanate (TMDI) and also its isomers, isophorone diisocyanate, 1,4-cyclohexane diisocyanate, 1-methyl-2,4-cyclohexane diisocyanate and 1-methyl-2,6-cyclohexane diisocyanate and also the corresponding isomer mixtures, 4,4'-dicyclohexylmethane-diisocyanate, 2,4'-dicyclohexylmethane diisocyanate and 2,2'-dicyclohexylmethane diisocyanate and also the corresponding isomer mixtures.

Preferred polyether diols b) preferably possess number-average molecular weights $\overline{M}_n$ of 500 to 10 000 g/mol, more preferably 500 to 6000 g/mol. They may be employed either individually or else in the form of mixtures with one another.

The number-average molecular weights can be determined by means of OH number determination in accordance with ASTM D 4274.

Suitable polyether diols can be prepared by reacting one or more alkylene oxides having 2 to 4 carbon atoms in the alkylene radical with a starter molecule that contains two active hydrogen atoms in bonded form. Examples of alkylene oxides include the following: ethylene oxide, 1,2-propylene oxide, epichlorohydrin, 1,2-butylene oxide and 2,3-butylene oxide. The alkylene oxides may be used individually, alternatingly in succession or as mixtures. Starter molecules contemplated include, for example, the following: water, amino alcohols, such as N-alkyldiethanolamines, an example being N-methyldiethanolamine, and diols such as ethylene glycol, diethylene glycol, 1,3-propylene glycol, 1,4-butanediol and 1,6-hexanediol. Optionally it is also possible to use mixtures of starter molecules. Suitable polyether diols are, furthermore, the hydroxyl group-containing polymerization products of tetrahydrofuran and/or of 1,3-propylene glycol. Use may also be made of trifunctional polyethers in fractions of 0 to 30 weight %, based on the difunctional polyethers, but at most in an amount such that the resultant product can still be processed as a thermoplastic.

Preferred polyether diols are Zerewitinoff-active polyether diols having on average at least 1.8 to not more than 3.0, preferably 1.8 to 2.2, Zerewitinoff-active hydrogen atoms.

Hydrogen atoms termed Zerewitinoff-active are all hydrogen atoms bonded to N, O or S that yield methane by reaction with methylmagnesium halide, according to a method discovered by Zerewitinoff. The determination is made according to the Zerewitinoff reaction, with methylmagnesium iodide being added to the compound under analysis and reaction taking place with acidic hydrogen to form a magnesium salt and the corresponding hydrocarbon. The resultant methane is determined by gas volumetry.

Preferred chain extenders c) are Zerewitinoff-active chain extenders which have on average 1.8 to 3.0 Zerewitinoff-active hydrogen atoms. By these, in addition to compounds containing amino groups, thiol groups or carboxyl groups, are meant those having two to three, preferably two, hydroxyl groups. Hydroxyl compounds having two to three, preferably two, hydroxyl groups are particularly preferred as chain extenders.

Chain-extending agents used are, for example and preferably, diols or diamines having a molecular weight of 60 to 500 g/mol, preferably aliphatic diols having 2 to 14 carbon atoms, such as, for example, 1,2-ethanediol (ethylene glycol), 1,2-propanediol, 1,3-propanediol, 1,4-butanediol, 2,3-butanediol, 1,5-pentanediol, 1,6-hexanediol, diethylene glycol and dipropylene glycol. Also suitable, however, are diesters of terephthalic acid with diols having 2 to 4 carbon atoms, for example terephthalic acid bisethylene glycol or terephthalic acid bis-1,4-butanediol, hydroxyalkylene ethers of hydroquinone, for example 1,4-di(β-hydroxyethyl)hydroquinone, ethoxylated bisphenols, for example 1,4-di(β-hydroxyethyl)bisphenol A, (cyclo)aliphatic diamines, such as isophoronediamine, ethylenediamine, 1,2-propylenediamine, 1,3-propylenediamine, N-methylpropylene-1,3-diamine, N,N'-dimethylethylenediamine and aromatic diamines, such as 2,4-tolylenediamine, 2,6-tolylenediamine, 3,5-diethyl-2,4-tolylenediamine or 3,5-diethyl-2,6-tolylenediamine, or primary mono-, di-, tri- or tetra-alkyl-substituted 4,4'-diaminodiphenylmethanes. Particularly preferred for use as chain extenders are ethanediol, 1,2-propanediol, 1,3-propanediol, 1,4-butanediol, 1,6-hexanediol, 1,4-di(β-hydroxyethyl)hydroquinone or 1,4-di(β-hydroxyethyl)bisphenol A. Mixtures of the abovementioned chain extenders may also be used. Besides these, relatively small amounts of triols as well may be added.

Particularly preferred chain extenders c) are, for example, diols such as ethylene glycol, 1,4-butanediol, 1,6-hexanediol or mixtures thereof.

The relative amounts of the compounds b) and c) are preferably selected such that the ratio of the sum of the isocyanate groups in a) to the sum of the Zerewitinoff-active hydrogen atoms in b) and c) is 0.85:1 to 1.2:1, more preferably 0.9:1 to 1.1:1.

The thermoplastic polyurethanes may optionally comprise catalysts d). Suitable catalysts are the customary tertiary amines known in accordance with the prior art, such as, for example, triethylamine, dimethylcyclohexylamine, N-methylmorpholine, N,N'-dimethylpiperazine, 2-(dimethylaminoethoxy)-ethanol, diazabicyclo[2.2.2]octane and the like, and also, in particular, organometallic compounds such as titanic esters, iron compounds or tin compounds such as tin diacetate, tin dioctoate, tin dilaurate or the tin dialkyl salts of aliphatic carboxylic acids such as dibutyltin diacetate or dibutyltin dilaurate or the like. Preferred catalysts are organometallic compounds more particularly titanic esters, iron compounds and tin compounds. The total amount of catalysts in the thermoplastic polyurethanes is generally about 0 to 5 weight %, preferably 0 to 2 weight %, based on the total weight of the TPU.

The thermoplastic polyurethanes (TPU) may optionally, as auxiliaries and adjuvants, comprise e) 0 up to a maximum of 20 weight %, preferably 0 to 10 weight %, based on the total weight of the TPU, of the customary auxiliaries and adjuvants. Typical auxiliaries and adjuvants are pigments, dyes, flame retardants, stabilizers to counter effects of ageing and of weathering, plasticizers, lubricants, mould release agents, chain terminators, substances with fungistatic and bacteriostatic effect, and also fillers, and mixtures thereof.

As such adjuvants it is possible with preference, among others, to use compounds that are monofunctional with respect to isocyanates, in fractions of up to 2 weight %, based on the total weight of the thermoplastic polyurethane, as what are called chain terminators or mould release aids. Suitable examples include monoamines such as butylamine and dibutylamine, octylamine, stearylamine, N-methylstearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether.

Examples of other adjuvants are lubricants, such as fatty acid esters, their metal soaps, fatty acid amides, fatty acid ester amides and silicone compounds, anti-blocking agents, inhibitors, stabilizers to counter hydrolysis, light, heat and discoloration, flame retardants, dyes, pigments, organic and/or inorganic fillers, examples being polycarbonates, and also plasticizers and reinforcing agents. Reinforcing agents are, in particular, fibre-like reinforcing materials such as inorganic fibres, for example, which may be prepared in accordance with the prior art and may also have been treated with a size. Further details of the stated auxiliaries and adjuvants can be found in the technical literature, an example being the monograph by J. H. Saunders and K. C. Frisch "High Polymers", Volume XVI, Polyurethane, Parts 1 and 2, Interscience Publishers 1962 and 1964, respectively; the Taschenbuch für Kunststoff-Additive by R. Gächter and H. Müller (Hanser Verlag Munich 1990); or DE-A 29 01 774.

One of the advantages of using TPU as the transparent thermoplastic in the layer (O) is that TPU is a hot-melt adhesive and it is therefore possible to generate sufficient adhesion both to the layer (P) and to any other external layers in the window or in the inventive document of security and/or value, and this adhesion cannot be undone again without destruction, for reasons including that of the photochromic or thermochromic materials integrated into this layer.

By transparency in the context of this invention is meant a transmission for light with a wavelength of 380 nm to 800 nm of more than 70%, preferably of more than 80%, more preferably of more than 85%. The transmission can be measured using a BYK Haze-gard plus from BYK Additives & Instruments in accordance with ASTM D 1003.

The photopolymer in the layer (P) is preferably a photopolymer prepared from a photopolymer formulation comprising an isocyanate-reactive component A), a polyisocyanate component B), a writing monomer C) and a photoinitiator D).

The polyisocyanate component A) comprises at least one organic compound which has at least two NCO groups (polyisocyanate).

As polyisocyanate it is possible to use all of the compounds well known per se to the skilled person, or mixtures thereof. These compounds may have an aromatic, araliphatic, aliphatic or cycloaliphatic basis. In minor amounts, the polyisocyanate component A) may also comprise monoisocyanates, in other words organic compounds having one NCO group, and/or polyisocyanates containing unsaturated groups.

Examples of suitable polyisocyanates are butylene diisocyanate, hexamethylene diisocyanate (HDI), 2,2,4-trimethylhexamethylene diisocyanate and its isomers (TMDI), isophorone diisocyanate (IPDI), 1,8-diisocyanato-4-(isocyanatomethyl)octane, the isomeric bis(4,4'-isocyanatocyclohexyl)methanes and their mixtures with any desired isomer content, isocyanatomethyloctane 1,8-diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- and/or 4,4'-diphenylmethane diisocyanate, triphenylmethane 4,4',4"-triisocyanate or any desired mixtures of the aforementioned compounds.

Monomeric diisocyanates or triisocyanates with urethane, urea, carbodiimide, acylurea, isocyanurate, allophanate, biuret, oxadiazintrione, uretdione and/or iminooxadiazinedione structures may likewise be used.

Preferred polyisocyanates are those based on aliphatic and/or cycloaliphatic diisocyanates or triisocyanates.

With particular preference the polyisocyanates are dimerized or oligomerized aliphatic and/or cycloaliphatic diisocyanates or triisocyanates.

Especially preferred polyisocyanates are isocyanurates, uretdiones and/or iminooxadiazinediones based on HDI, TMDI, 1,8-diisocyanato-4-(isocyanatomethyl)octane or mixtures thereof.

The polyisocyanate component A) may also comprise or consist of NCO-functional prepolymers. The prepolymers may have urethane, allophanate, biuret and/or amide groups. Prepolymers of these kinds are obtainable for example by reaction of polyisocyanates A1) with isocyanate-reactive compounds A2).

Suitable polyisocyanates A1) include all known aliphatic, cycloaliphatic, aromatic or araliphatic diisocyanate and triisocyanate. Besides these it is also possible to use the known derivatives, of higher molecular mass, of monomeric diisocyanates and/or triisocyanates with urethane, urea, carbodiimide, acylurea, isocyanurate, allophanate, biuret, oxadiazintrione, uretdione and/or iminooxadiazinedione structure, in each case individually or in any desired mixtures with one another.

Examples of suitable monomeric diisocyanates or triisocyanates which may be used as polyisocyanate a1) are butylene diisocyanate, hexamethylene diisocyanate, isophorone diisocyanate, trimethylhexamethylene diisocyanate (TMDI), 1,8-diisocyanato-4-(isocyanatomethyl)octane, isocyanatomethyloctane 1,8-diisocyanate (TIN), 2,4- and/or 2,6-toluene diisocyanate.

As isocyanate-reactive compounds A2) it is possible with preference to use OH-functional compounds. These may more particularly be polyols. As isocyanate-reactive compound A2) it is possible with very particular preference to use the component B) polyols described later on below.

It is likewise possible to use amines as isocyanate-reactive compounds A2). Examples of suitable amines are ethylenediamine, diethylenetriamine, triethylenetetramine, propylenediamine, diaminocyclohexane, diaminobenzene, diaminobisphenyl, difunctional polyamines such as, for example, the Jeffamine®s, amine-terminated polymers, especially those having number-average molar masses of up to 10 000 g/mol. Mixtures of the aforementioned amines may likewise be used.

It is also preferred if the isocyanate-reactive compounds A2) have a number-average molar mass of ≥200 and ≤10 000 g/mol, more preferably ≥500 and ≤8500 g/mol and very preferably ≥1000 and ≤8200 g/mol.

The prepolymers of the polyisocyanate component A) may in particular have a residual free monomeric isocyanate content <1 weight %, more preferably <0.5 weight % and very preferably <0.2 weight %.

The polyisocyanate component A) may also comprise mixtures of the aforementioned polyisocyanates and prepolymers.

It is optionally also possible for the polyisocyanate component A) to include proportions of polyisocyanates which have undergone partial reaction with isocyanate-reactive, ethylenically unsaturated compounds. As isocyanate-reactive, ethylenically unsaturated compounds in this context it is preferred to use α,β-unsaturated carboxylic acid derivatives such as acrylates, methacrylates, maleates, fumarates, maleimides, acrylamides, and also vinyl ethers, propenyl ethers, allyl ethers and compounds containing dicyclopentadienyl units and having at least one isocyanate-reactive group. Particularly preferred are acrylates and methacrylates having at least one isocyanate-reactive group.

The fraction of the polyisocyanates in the polyisocyanate component A) that is partially reacted with isocyanate-reactive, ethylenically unsaturated compounds can be 0 to 99 weight %, preferably 0 to 50 weight %, more preferably 0 to 25 weight % and very preferably 0 to 15 weight %.

It is, optionally, also possible for the polyisocyanate component A) to include, wholly or proportionally, polyisocyanates which have undergone complete or partial reaction with blocking agents known from coatings technology. Examples of blocking agents are alcohols, lactams, oximes, malonic esters, alkyl acetoacetates, triazoles, phenols, imidazoles, pyrazoles and amines, such as, for example butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butylbenzylamine, cyclopentanone carboxyethyl ester or mixtures thereof.

It is particularly preferred for the polyisocyanate component A) to comprise or consist of an aliphatic polyisocyanate or an aliphatic prepolymer and preferably an aliphatic polyisocyanate or aliphatic prepolymer having primary NCO groups.

The isocyanate-reactive component B) comprises at least one organic compound which has at least two isocyanate-reactive groups (isocyanate-reactive compound). In the context of the present invention, isocyanate-reactive groups are considered to be hydroxyl, amino or thio groups. Preferred isocyanate-reactive groups used are hydroxyl and amino groups, and particularly preferred isocyanate-reactive groups used are hydroxyl groups.

As an isocyanate-reactive component it is possible to use all systems which on average have at least 1.5 and preferably 2 to 3 isocyanate-reactive groups.

Examples of suitable isocyanate-reactive compounds include polyester, polyether, polycarbonate, poly(meth)acrylate and/or polyurethane polyols.

Particularly suitable polyester polyols are, for example, linear or branched polyester polyols which are obtainable from aliphatic, cycloaliphatic or aromatic dicarboxylic and/or polycarboxylic acids and/or their anhydrides by reaction with polyhydric alcohols with an OH functionality $\geq 2$.

The polyester polyols may also be based on natural raw materials such as castor oil. It is likewise possible for the polyester polyols to be based on homopolymers or copolymers of lactones. These polymers may be obtained preferably by addition of lactones or lactone mixtures such as butyrolactone, $\epsilon$-caprolactone and/or methyl-$\epsilon$-caprolactone onto hydroxy-functional compounds such as polyhydric alcohols with an OH functionality $\geq 2$, such as those of the kind stated above, for example.

The polyester polyols preferably have number-average molar masses of $\geq 400$ and $\leq 4000$ g/mol, more preferably of $\geq 500$ and $\leq 2000$ g/mol.

The OH functionality of the polyester polyols is preferably 1.5 to 3.5, more preferably 1.8 to 3.0.

Examples of dicarboxylic and/or polycarboxylic acids and/or anhydrides particularly suitable for preparing the polyesters are succinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic or trimellitic acid and also acid anhydrides such as o-phthalic, trimellitic or succinic anhydride or mixtures thereof.

Examples of alcohols particularly suitable for preparing the polyesters are ethanediol, di-, tri- and tetraethylene glycol, 1,2-propanediol, di-, tri- and tetrapropylene glycol, 1,3-propanediol, butan-1,4-diol, butane-1,3-diol, butane-2,3-diol, pentane-1,5-diol, hexane-1,6-diol, 2,2-dimethyl-1,3-propanediol, 1,4-dihydroxycyclohexane, 1,4-dimethylolcyclohexane, octane-1,8-diol, decane-1,10-diol, dodecane-1,12-diol, trimethylolpropane, glycerol or mixtures thereof.

Suitable polycarbonate polyols are obtainable in a conventional way by reaction of organic carbonates or phosgene with diols or diol mixtures.

Organic carbonates suitable for this purpose are, for example, dimethyl, diethyl and diphenyl carbonate.

Suitable polyhydric alcohols encompass the polyhydric alcohols with an OH functionality $\geq 2$ identified above in the context of the discussion of the polyester polyols. With preference it is possible to use 1,4-butanediol, 1,6-hexanediol and/or 3-methylpentanediol.

Polyester polyols can also be converted into polycarbonate polyols. In the reaction of the stated alcohols to give polycarbonate polyols, particular preference is given to using dimethyl or diethyl carbonate.

The polycarbonate polyols preferably have number-average molar masses of $\geq 400$ and $\leq 4000$ g/mol, more preferably of $\geq 500$ and $\leq 2000$ g/mol.

The OH functionality of the polycarbonate polyols is preferably 1.8 to 3.2, more preferably 1.9 to 3.0.

Suitable polyether polyols are polyadducts, optionally of blockwise construction, of cyclic ethers onto OH- or NH-functional starter molecules. Examples of suitable cyclic ethers are styrene oxides, ethylene oxide, propylene oxide, tetrahydrofuran, butylene oxide, epichlorohydrin, and also any desired mixtures thereof. Starter molecules which can be used are the polyhydric alcohols identified above in connection with the discussion of the polyester polyols, with an OH functionality $\geq 2$, and also primary or secondary amines and amino alcohols.

Preferred polyether polyols are those of the aforementioned kind which are based exclusively on propylene oxide. Likewise preferred are polyether polyols of the aforementioned kind which are random copolymers or block copolymers, based on propylene oxide with further 1-alkylene oxides, the 1-alykene oxide fraction being in particular not more than 80 weight %. Especially preferred are propylene oxide homopolymers and also random copolymers or block copolymers which have oxyethylene, oxypropylene and/or oxybutylene units, the fraction of the oxypropylene units, based on the total amount of all oxyethylene, oxypropylene and oxybutylene units, being in particular $\geq 20$ weight %, preferably $\geq 45$ weight %. Oxypropylene and oxybutylene here encompass all linear and branched C3 and C4 isomers.

The polyether polyols preferably have number-average molar masses of $\geq 250$ and $\leq 10\,000$ g/mol, more preferably of $\geq 500$ and $\leq 8500$ g/mol and very preferably of $\geq 600$ and $\leq 4500$ g/mol. Their OH functionality is preferably 1.5 to 4.0 and more preferably 1.8 to 3.1.

Further preferred polyether polyols consist of an isocyanate-reactive component comprising hydroxy-functional multiblock copolymers of type $Y(X_i—H)_n$ with i=1 to 10 and n=2 to 8, the segments $X_i$ being constructed in each case of oxyalkylene units of the formula (I)

$$—CH_2—CH(R)—O— \qquad (I)$$

in which R is an alkyl or an aryl radical, which may also be substituted or else interrupted by heteroatoms (such as ether oxygens), or is hydrogen, and Y is the parent starter.

The radical R may preferably be a hydrogen, methyl, butyl, hexyl, octyl or an ether-group-containing alkyl radical. Preferred ether-group-containing alkyl radicals are based on oxyalkylene units.

Preferably n is an integer from 2 to 6, more preferably 2 or 3 and very preferably 2.

It is likewise preferred if i is an integer from 1 to 6, more preferably from 1 to 3 and very preferably 1.

It is further preferred if the fraction of the segments $X_i$, based on the total amount of the segments Xi and Y, is >50 weight % and preferably $\geq 66$ weight %.

It is also preferred if the fraction of the segments Y, based on the total amount of the segments $X_i$ and Y, is <50 weight % and preferably <34 weight %.

The multiblock copolymers $Y(X_i—H)_n$ preferably have number-average molecular weights of >1200 g/mol, more preferably >1950 g/mol, but preferably <12 000 g/mol, more preferably <8000 g/mol.

The blocks $X_i$ may be homopolymers, consisting exclusively of the same repeating oxyalkylene units. They may also be constructed randomly from different oxyalkylene units or in turn constructed blockwise from different oxyalkylene units.

The segments $X_i$ are preferably based exclusively on propylene oxide or on random or blockwise mixtures of propylene oxide with other 1-alkylene oxides, in which case the fraction of other 1-alykene oxides is preferably not >80 weight %.

Particularly preferred segments $X_i$ are propylene oxide homopolymers and also random copolymers or block copolymers which have oxyethylene and/or oxypropylene units. With very particular preference in this case the fraction of the oxypropylene units, based on the total amount of all oxyethylene and oxypropylene units, is ≥20 weight % and more preferably still ≥40 weight %.

The blocks $X_i$ can be added, by ring-opening polymerization of the above-described alkylene oxides, onto an n-fold hydroxy-functional or amino-functional starter $Y(H)_n$.

The starter $Y(H)_n$ may consist of di- and/or poly-hydroxy-functional polymer structures based on cyclic ethers or of di- and/or poly-hydroxy-functional polycarbonate, polyester, poly(meth)acrylate, epoxy resin and/or polyurethane structural units or corresponding hybrids.

Examples of suitable starters $Y(H)_n$ are the abovementioned polyester, polycarbonate and polyether polyols.

The polyester polyols preferably have number-average molar masses of 200 to 2000 g/mol, more preferably of 400 to 1400 g/mol.

The polycarbonate polyols preferably have number average molar masses of 400 to 2000 g/mol, more preferably of 500 to 1400 g/mol and very preferably of 650 to 1000 g/mol.

The polyether polyols preferably have number average molar masses of 200 to 2000 g/mol, more preferably of 400 to 1400 g/mol and very preferably of 650 to 1000 g/mol.

Particularly preferred starters $Y(H)_n$ are in particular difunctional polymers of tetrahydrofuran, in particular difunctional aliphatic polycarbonate polyols and polyester polyols, and also polymers of ε-caprolactone, in particular with number-average molar masses <3100 g/mol, preferably ≥500 g/mol and ≤2100 g/mol.

Further examples of suitable polyethers and processes for preparing them are described in EP 2 172 503 A1, the relevant disclosure content of which is hereby incorporated by reference.

A further preferred embodiment provides for the writing monomer C) to comprise at least one monofunctional and/or one polyfunctional writing monomer, which more particularly may be monofunctional and polyfunctional acrylate writing monomers. With particular preference the writing monomer may comprise at least one monofunctional and one polyfunctional urethane (meth)acrylate.

The acrylate writing monomers may be more particularly compounds of the general formula (II)

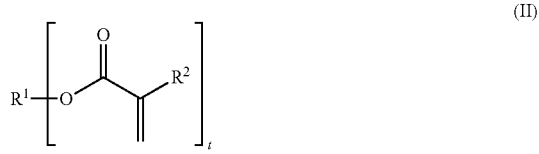

(II)

where n≥1 and n≤4 and $R^1$ and $R^2$ are independently of each other hydrogen, linear, branched, cyclic or heterocyclic unsubstituted or else optionally heteroatom-substituted organic radicals. It is particularly preferable for $R^2$ to be hydrogen or methyl and/or $R^1$ to be a linear, branched, cyclic or heterocyclic unsubstituted or else optionally heteroatom-substituted organic radical.

It is similarly possible to add further unsaturated compounds such as α,β-unsaturated carboxylic acid derivatives such as acrylates, methacrylates, maleates, fumarates, maleimides, acrylamides, also vinyl ethers, propenyl ethers, allyl ethers and dicyclopentadienyl unit-containing compounds and also olefinically unsaturated compounds such as, for example, styrene, α-methylstyrene, vinyltoluene, olefins, for example 1-octene and/or 1-decene, vinyl esters, (meth) acrylonitrile, (meth)acrylamide, methacrylic acid, acrylic acid. Preference, however, is given to acrylates and methacrylates.

In general, esters of acrylic acid and methacrylic acid are designated as acrylates and methacrylates, respectively. Examples of acrylates and methacrylates which can be used are methyl acrylate, methyl methacrylate, ethyl acrylate, ethyl methacrylate, ethoxyethyl acrylate, ethoxyethyl methacrylate, n-butyl acrylate, n-butyl methacrylate, tert-butyl acrylate, tert-butyl methacrylate, hexyl acrylate, hexyl methacrylate, 2-ethylhexyl acrylate, 2-ethylhexyl methacrylate, butoxyethyl acrylate, butoxyethyl methacrylate, lauryl acrylate, lauryl methacrylate, isobornyl acrylate, isobornyl methacrylate, phenyl acrylate, phenyl methacrylate, p-chlorophenyl acrylate, p-chlorophenyl methacrylate, p-bromophenyl acrylate, p-bromophenyl methacrylate, 2,4,6-trichlorophenyl acrylate, 2,4,6-trichlorophenyl methacrylate, 2,4,6-tribromophenyl acrylate, 2,4,6-tribromophenyl methacrylate, pentachlorophenyl acrylate, pentachlorophenyl methacrylate, pentabromophenyl acrylate, pentabromophenyl methacrylate, pentabromobenzyl acrylate, pentabromobenzyl methacrylate, phenoxyethyl acrylate, phenoxyethyl methacrylate, phenoxyethoxyethyl acrylate, phenoxyethoxyethyl methacrylate, phenylthioethyl acrylate, phenylthioethyl methacrylate, 2-naphthyl acrylate, 2-naphthyl methacrylate, 1,4-bis(2-thionaphthyl)-2-butyl acrylate, 1,4-bis(2-thionaphthyl)-2-butyl methacrylate, propane-2,2-diylbis[(2,6-dibromo-4,1-phenylene)oxy(2-{[3,3,3-tris(4-chlorophenyl) propanoyl]oxy}propane-3,1-diyl)oxyethane-2,1-diyl] diacrylate, bisphenol A diacrylate, bisphenol A dimethacrylate, tetrabromobisphenol A diacrylate, tetrabromobisphenol A dimethacrylate and the ethoxylated analogue compounds thereof, N-carbazolyl acrylates, to mention only a selection of acrylates and methacrylates which may be used.

Further urethane acrylates can of course also be used. Urethane acrylates are understood as meaning compounds having at least one acrylic ester group which additionally have at least one urethane bond. It is known that such compounds can be obtained by reacting a hydroxy-functional acrylic ester with an isocyanate-functional compound.

Examples of isocyanate-functional compounds which can be used for this purpose are aromatic, araliphatic, aliphatic and cycloaliphatic di-, tri- or polyisocyanates. It is also possible to use mixtures of such di-, tri- or polyisocyanates. Examples of suitable di-, tri- or polyisocyanates are butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate, the isomeric bis(4,4'-isocyanatocyclohexyl)methanes and mixtures thereof having any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate, 1,5-naphthylene diisocyanate, m-methylthiophenyl isocyanate, triphenylmethane 4,4',4"-triisocyanate and tris(p-isocyanatophenyl) thiophosphate or derivatives thereof having a urethane, urea, carbodiimide, acylurea, isocyanurate, allophanate, biuret, oxadiazinetrione, uretdione or iminooxadiazinedione structure and mixtures thereof. Aromatic or araliphatic di-, tri- or polyisocyanates are preferred in this case.

Suitable hydroxy-functional acrylates or methacrylates for the preparation of urethane acrylates are compounds for example such as 2-hydroxyethyl (meth)acrylate, polyethylene oxide mono(meth)acrylates, polypropylene oxide mono (meth)acrylates, polyalkylene oxide mono(meth)acrylates, poly(ε-caprolactone) mono(meth)acrylates, such as, for example, Tone® M100 (Dow, Schwalbach, Germany), 2-hydroxypropyl (meth)acrylate, 4-hydroxybutyl (meth)acrylate, 3-hydroxy-2,2-dimethylpropyl (meth)acrylate, hydroxypropyl (meth)acrylate, 2-hydroxy-3-phenoxypropyl acrylate, the hydroxyfunctional mono-, di- or tetraacrylates of polyhydric alcohols, such as trimethylolpropane, glycerol, pentaerythritol, dipentaerythritol, ethoxylated, propoxylated or alkoxylated trimethylolpropane, glycerol, pentaerythritol, dipentaerythritol or industrial mixtures thereof. 2-Hydroxyethyl acrylate, hydroxypropyl acrylate, 4-hydroxybutyl acrylate and poly(ε-caprolactone) mono(meth)acrylates are preferred. In addition, isocyanate-reactive oligomeric or polymeric unsaturated compounds containing acrylate and/or methacrylate groups, alone or in combination with the abovementioned monomeric compounds, are suitable. The epoxy (meth)acrylates known per se containing hydroxyl groups and having OH contents of 20 to 300 mg KOH/g or polyurethane (meth)acrylates containing hydroxyl groups and having OH contents of 20 to 300 mg KOH/g or acrylated polyacrylates having OH contents of 20 to 300 mg KOH/g and mixtures thereof with one another and mixtures with unsaturated polyesters containing hydroxyl groups and mixtures with polyester (meth)acrylates or mixtures of unsaturated polyesters containing hydroxyl groups with polyester (meth)acrylates can likewise be used.

Preference is given particularly to urethane acrylates obtainable from the reaction of tris(p-isocyanatophenyl) thiophosphate and m-methylthiophenyl isocyanate with alcohol-functional acrylates such as hydroxyethyl (meth) acrylate, hydroxypropyl (meth)acrylate and hydroxybutyl (meth)acrylate.

Particularly preferred is a combination of components A) and B) consisting of adducts of butyrolactone, ε-caprolactone and/or methyl-ε-caprolactone onto polyether polyols with a functionality of 1.8 to 3.1, having number-average molar masses of 200 to 4000 g/mol, in conjunction with isocyanurates, uretdiones, iminooxadiazinediones and/or other oligomers based on HDI. Especially preferred are adducts of ε-caprolactone onto poly(tetrahydrofurans) having a functionality of 1.9 to 2.2 and number-average molar masses of 500 to 2000 g/mol (more particularly 600 to 1400 g/mol), whose number-average overall molar mass is from 800 to 4500 g/mol, more particularly from 1000 to 3000 g/mol, in conjunction with oligomers, isocyanurates and/or iminooxadiazinediones based on HDI.

In another preferred embodiment, it is provided that the photopolymer formulation further comprises urethanes as additives, it being possible for the urethanes more particularly to be substituted by at least one fluorine atom.

The urethanes preferably may have the general formula (III)

in which m≥1 and m≤8 and $R^3$, $R^4$ and $R^5$ independently of one another are hydrogen or are linear, branched, cyclic or heterocyclic organic radicals which are unsubstituted or else optionally substituted by heteroatoms, preferably at least one of the radicals $R^3$, $R^4$ and $R^5$ being substituted by at least one fluorine atom, and more preferably $R^3$ being an organic radical having at least one fluorine atom. With particular preference $R^4$ is a linear, branched, cyclic or heterocyclic organic radical which is unsubstituted or else optionally also substituted by heteroatoms such as fluorine, for example.

The employed photoinitiators D) are typically compounds which are activatable by actinic radiation and capable of inducing a polymerization of the corresponding groups.

Photoinitiators can be distinguished into unimolecular initiators (type I) and bimolecular initiators (type II). They are further distinguished according to their chemical character into photoinitiators for radical, anionic, cationic or mixed type of polymerization.

Type I photoinitiators (Norrish type I) for radical photopolymerization form free radicals on irradiation by unimolecular bond cleavage.

Examples of type I photoinitiators are triazines, for example tris(trichloromethyl)triazine, oximes, benzoin ethers, benzil ketals, alpha-alpha-dialkoxyacetophenone, phenylglyoxylic esters, bisimidazoles, aroylphosphine oxides, e.g. 2,4,6-trimethylbenzoyldiphenylphosphine oxide, sulphonium and iodonium salts.

Type II photoinitiators (Norrish type II) for radical polymerization undergo a bimolecular reaction on irradiation wherein the photoinitiator reacts in the excited state with a second molecule, the coinitiator, and forms the polymerization-inducing radicals by electron or proton transfer or direct hydrogen abstraction.

Examples of type II photoinitiators are quinones, for example camphorquinone, aromatic keto compounds, for example benzophenones combined with tertiary amines, alkylbenzophenones, halogenated benzophenones, 4,4'-bis (dimethylamino)benzophenone (Michler's ketone), anthrone, methyl p-(dimethylamino)benzoate, thioxanthone, ketocoumarins, alpha-aminoalkylphenone, alpha-hydroxyalkylphenone and cationic dyes, for example methylene blue, combined with tertiary amines.

Type I and type II photoinitiators are used for the UV and short-wave visible region, while predominantly type II photoinitiators are used for the comparatively long-wave visible light region.

The photoinitiator systems described in EP 0 223 587 A, consisting of a mixture of an ammonium alkylarylborate and one or more dyes, are also useful as type II photoinitiator for radical polymerization. Examples of suitable ammonium alkylarylborates are tetrabutylammonium triphenylhexylborate, tetrabutylammonium triphenylbutylborate, tetrabutylammonium trinaphthylhexylborate, tetrabutylammonium tris(4-tert-butyl)phenylbutylborate, tetrabutylammonium tris(3-fluorophenyl)hexylborate, tetramethylammonium triphenylbenzylborate, tetra(n-hexyl)ammonium (sec-butyl) triphenylborate, 1-methyl-3-octylimidazolium dipentyldiphenylborate and tetrabutylammonium tris(3-chloro-4- methylphenyl)hexylborate (Cunningham et al., RadTech '98 North America UV/EB Conference Proceedings, Chicago, Apr. 19-22, 1998).

The photoinitiators used for anionic polymerization are generally type I systems and derive from transition metal complexes of the first row. Examples which may be mentioned here are chromium salts, for example trans-$Cr(NH_3)_2(NCS)_4^-$ (Kutal et al, Macromolecules 1991, 24, 6872) or ferrocenyl compounds (Yamaguchi et al. Macromolecules 2000, 33, 1152).

A further option for anionic polymerization is to use dyes, such as crystal violet leuconitrile or malachite green leuconitrile, which are capable of polymerizing cyanoacrylates through photolytic decomposition (Neckers et al. Macromolecules 2000, 33, 7761). The chromophore is incorporated here into the resulting polymers, making them intrinsically coloured.

Photoinitiators useful for cationic polymerization consist essentially of three classes: aryldiazonium salts, onium salts (here specifically: iodonium, sulphonium and selenonium salts) and also organometallic compounds. Phenyldiazonium salts are capable on irradiation of producing, not only in the presence but also in the absence of a hydrogen donor, a cation which initiates the polymerization. The efficiency of the overall system is determined by the nature of the counterion used to the diazonium compound. Preference is given here to the little-reactive but fairly costly $SbF_6^-$, $AsF_6^-$ or $PF_6^-$. These compounds are generally less suitable for use in coating thin films, since the nitrogen released following exposure reduces surface quality (pinholes) (Li et al., Polymeric Materials Science and Engineering, 2001, 84, 139).

Onium salts, specifically sulphonium and iodonium salts, are very widely used and also commercially available in a wide variety of forms. The photochemistry of these compounds has been the subject of sustained investigation. Iodonium salts on excitation initially disintegrate homolytically and thereby produce one radical and one radical cation which transitions first by hydrogen abstraction into a cation which finally releases a proton and thereby initiates cationic polymerization (Dektar et al. J. Org. Chem. 1990, 55, 639; J. Org. Chem., 1991, 56. 1838). This mechanism makes it possible for iodonium salts to likewise be used for radical photopolymerization. The choice of counterion is again very important here. Preference is likewise given to using $SbF_6^-$, $AsF_6^-$ or $PF_6^-$. This structural class is in other respects fairly free as regards the choice of substitution of the aromatic, which is essentially determined by the availability of suitable synthons. Sulphonium salts are compounds that decompose by the Norrish type II mechanism (Crivello et al., Macromolecules, 2000, 33, 825). The choice of counterion is also critically important in sulphonium salts, and is substantially reflected in the curing rate of the polymers. The best results are generally achieved with $SbF_6^-$ salts.

Since the intrinsic absorption of iodonium and sulphonium salts is <300 nm, these compounds should be appropriately sensitized for photopolymerization with near UV or short-wave visible light. This is accomplished by using aromatics that absorb at longer wavelengths, for example anthracene and derivatives (Gu et al., Am. Chem. Soc. Polymer Preprints, 2000, 41 (2), 1266) or phenothiazine and/or derivatives thereof (Hua et al, Macromolecules 2001, 34, 2488-2494).

It can be advantageous to use mixtures of these sensitizers or else photoinitiators. Depending on the radiation source used, photoinitiator type and concentration has to be adapted in a manner known to a person skilled in the art. Further particulars are described for example in P. K. T. Oldring (Ed.), Chemistry & Technology of UV & EB Formulations For Coatings, Inks & Paints, Vol. 3, 1991, SITA Technology, London, pp. 61-328.

Preferred photoinitiators are mixtures of tetrabutylammonium tetrahexylborate, tetrabutylammonium triphenylhexylborate, tetrabutylammonium triphenylbutylborate, tetrabutylammonium tris(3-fluorophenyl)hexylborate ([191726-69-9], CGI 7460, product from BASF SE, Basel, Switzerland) and tetrabutylammonium tris(3-chloro-4-methylphenyl)hexylborate ([1147315-11-4], CGI 909, product from BASF SE, Basel, Switzerland) with cationic dyes as described for example in H. Berneth in Ullmann's Encyclopedia of Industrial Chemistry, Cationic Dyes, Wiley-VCH Verlag, 2008.

Examples of cationic dyes are Astrazon Orange G, Basic Blue 3, Basic Orange 22, Basic Red 13, Basic Violet 7, Methylene Blue, New Methylene Blue, Azure A, Pyrillium I, Safranin O, cyanine, gallocyanine, brilliant green, crystal violet, ethyl violet and thionine.

It is particularly preferable for the photopolymer formulation of the invention to contain a cationic dye of formula $F^+An^-$.

Cationic dyes of formula $F^+$ are preferably cationic dyes of the following classes: acridine dyes, xanthene dyes, thioxanthene dyes, phenazine dyes, phenoxazine dyes, phenothiazine dyes, tri(het)arylmethane dyes—especially diamino- and triamino(het)arylmethane dyes, mono-, di- and trimethinecyanine dyes, hemicyanine dyes, externally cationic merocyanine dyes, externally cationic neutrocyanine dyes, nullmethine dyes—especially naphtholactam dyes, streptocyanine dyes. Such dyes are described for example in H. Berneth in Ullmann's Encyclopedia of Industrial Chemistry, Azine Dyes, Wiley-VCH Verlag, 2008, H. Berneth in Ullmann's Encyclopedia of Industrial Chemistry, Methine Dyes and Pigments, Wiley-VCH Verlag, 2008, T. Gessner, U. Mayer in Ullmann's Encyclopedia of Industrial Chemistry, Triarylmethane and Diarylmethane Dyes, Wiley-VCH Verlag, 2000.

$An^-$ is to be understood as referring to an anion. Preferred anions $An^-$ are especially $C_8$- to $C_{25}$-alkansulphonate, preferably $C_{13}$- to $C_{25}$-alkanesulphonate, $C_3$- to $C_{18}$-perfluoroalkanesulphonate, $C_4$- to $C_{18}$-perfluoroalkanesulphonate bearing at least 3 hydrogen atoms in the alkyl chain, $C_9$- to $C_{25}$-alkanoate, $C_9$- to $C_{25}$-alkenoate, $C_8$ to $C_{25}$-alkyl sulphate, preferably $C_{13}$- to $C_{25}$-alkyl sulphate, $C_8$- to $C_{25}$-alkenyl sulphate, preferably $C_{13}$- to $C_{25}$-alkenyl sulphate, $C_3$- to $C_{18}$-perfluoroalkyl sulphate, $C_4$- to $C_{18}$-perfluoroalkyl sulphate bearing at least 3 hydrogen atoms in the alkyl chain, polyether sulphates based on at least 4 equivalents of ethylene oxide and/or 4 equivalents of propylene oxide, bis-$C_4$- to $C_{25}$-alkyl sulphosuccinate, bis-$C_5$- to $C_7$-cycloalkyl sulphosuccinate, bis-$C_3$- to $C_8$-alkenyl sulphosuccinate, bis-$C_7$- to $C_{11}$-aralkyl sulphosuccinate, bis-$C_2$- to $C_{10}$-alkyl sulphosuccinate substituted by at least 8 fluorine atoms, $C_8$- to $C_{25}$-alkyl sulphoacetates, benzenesulphonate substituted by at least one moiety from the group halogen, $C_4$- to $C_{25}$-alkyl, perfluoro-$C_1$- to $C_8$-alkyl and/or $C_1$- to $C_{12}$-alkoxycarbonyl, optionally nitro-, cyano-, hydroxyl-, $C_1$- to $C_{25}$-alkyl-, $C_1$- to $C_{12}$-alkoxy-, amino-, $C_1$- to $C_{12}$-alkoxycarbonyl- or chlorine-substituted naphthalene- or biphenylsulphonate, optionally nitro-, cyano-, hydroxyl-, $C_1$- to $C_{25}$-alkyl-, $C_1$- to $C_{12}$-alkoxy-, $C_1$- to $C_{12}$-alkoxycarbonyl- or chlorine-substituted benzene-, naphthalene- or biphenyldisulphonate, dinitro-, $C_6$- to $C_{25}$-alkyl-, $C_4$- to $C_{12}$-alkoxycarbonyl-, benzoyl-, chlorobenzoyl- or toluoyl-substituted benzoate, the anion of naphthalenedicarboxylic acid, diphenyl ether disulphonate, sulphonated or sulphated, optionally mono- or polyunsaturated $C_8$- to $C_{25}$-fatty acid esters of aliphatic $C_1$- to $C_8$-alcohols or glycerol, bis(sulpho-$C_2$- to $C_6$-alkyl) $C_3$ to $C_{12}$ alkanedicarboxylic acid esters, bis(sulpho-$C_2$ to $C_6$-alkyl) itaconic acid esters, (sulpho-$C_2$- to $C_6$-alkyl) $C_6$- to $C_{18}$-alkanecarboxylic acid esters, (sulpho-$C_2$- to $C_6$-alkyl) acrylic or methacrylic acid esters, triscatechol phosphate optionally substituted by up to 12 halogen moieties, an anion from the group tetraphenylborate, cyanotriphenylborate, tetraphenoxyborate, $C_4$- to $C_{12}$-alkyltriphenylborate whose phenyl or phenoxy moieties may be halogen-, $C_1$- to $C_4$-alkyl- and/or $C_1$- to $C_4$-alkoxy-substituted, $C_4$- to $C_{12}$-alkyltrinaphthylborate, tetra-$C_1$- to $C_{20}$-alkoxyborate, 7,8- or 7,9-dicarbanidoundecaborate(1-) or (2-), which are optionally substituted by one or two $C_1$- to $C_{12}$-alkyl or phenyl groups on the B and/or C atoms, dodecahydrodicarbadodecaborate(2-) or B—$C_1$- to $C_{12}$-alkyl-C-phenyl-dodecahydrodicarbadodecaborat(1-), where An⁻ in polyvalent anions such as naphthalenedisulphonate represents one equivalent of this anion, and where the alkane and alkyl groups may be branched and/or may be halogen-, cyano-, methoxy-, ethoxy-, methoxycarbonyl- or ethoxycarbonyl-substituted.

Particularly preferred anions are sec-$C_{11}$- to $C_{18}$-alkanesulphonate, $C_{13}$- to $C_{25}$-alkyl sulphate, branched $C_8$- to $C_{25}$-alkyl sulphate, optionally branched bis-$C_6$- to $C_{25}$-alkyl sulphosuccinate, sec- or tert-$C_4$- to $C_{25}$-alkylbenzenesulphonate, sulphonated or sulphated, optionally monounsaturated or polyunsaturated $C_1$- to $C_{25}$-fatty acid esters of aliphatic $C_1$- to $C_8$-alcohols or glycerol, bis(sulpho-$C_2$- to $C_6$-alkyl) $C_3$- to $C_{12}$-alkanedicarboxylic acid esters, (sulpho-$C_2$- to $C_6$-alkyl) $C_6$- to $C_{18}$-alkanecarboxylic acid esters, triscatechol phosphate substituted by up to 12 halogen moieties, cyanotriphenylborate, tetraphenoxyborate, butyltriphenylborate.

It is also preferable for the anion An⁻ of the dye to have an AC log P in the range of 1-30, more preferably in the range of 1-12 and even more preferably in the range of 1-6.5. The AC log P is computed as described in J. Comput. Aid. Mol. Des. 2005, 19, 453; Virtual Computational Chemistry Laboratory, http://www.vcclab.org.

Particular preference is given to dyes F⁺An⁻ having a water imbibition ≤5 wt %.

Water imbibition is given by formula (F-1)

$$W=(m_f/m_t-1)*100\%$$ (F-1), where $m_f$ is the mass of the dye after water saturation and $m_t$ is the mass of the dried dye. $m_t$ is ascertained by drying a particular quantity of dye to constant mass, at elevated temperature in vacuo for example. $m_f$ is determined by letting a particular quantity of dye stand in air at a defined humidity to constant weight.

It is especially preferable for the photoinitiator to comprise a combination of dyes, the absorption spectra of which cover the spectral region from 400 to 800 nm partly at least, with at least one coinitiator tuned to the dyes.

The layer (P) may preferably have a thickness of from 5 µm to 100 µm, more preferably from 5 µm to 30 µm, very preferably from 10 µm to 25 µm.

The window preferably comprises at least one further transparent layer comprising at least one thermoplastic and located on the side of the layer (P) that is remote from the layer (O). This layer may in particular improve the adhesion between the layer (P) and any external outer layers present, and prevent separation of the inventive document of security and/or value without destruction of the transparent window.

In preferred embodiments of the invention the layer (P) may have been applied to a substrate layer (S) which is incorporated, as precisely one such additional transparent layer, in the window of the inventive document of security and/or value. In that case the substrate layer (S) is preferably a layer comprising at least one transparent thermoplastic, more preferably at least one transparent polycarbonate or copolycarbonate.

The use of a substrate layer (S) which consists of thermoplastics comparable with those of the transparent exterior layers affords the following advantage: after lamination, the layer S forms and an inseparable connection with the outer layers, thereby further increasing the forgeproofness of the document.

In this embodiment, the layer (P) is located between the layer (O) and a substrate layer (S), the substrate layer (S) preferably comprising a thermoplastic which is similar to or the same as that of the transparent outer layer which borders the substrate layer (S). A plastic that is similar here means one which on lamination forms an inseparable, preferably monolithic laminar assembly with the other plastic.

More preferably, at least the transparent outer layer bordering the substrate layer (S), and especially preferably both transparent outer layers, and also the substrate layer (S), comprise at least one polycarbonate or copolycarbonate.

The window, moreover, may comprise further transparent layers of at least one thermoplastic.

In one preferred embodiment the window comprises at least two further transparent layers comprising at least one thermoplastic, one of these layers being located on the side of the layer P that is remote from the layer O and being preferably a TPU film (K), and the other layer being located on the side of the layer O that is remote from the layer P and likewise being a TPU film (K). The function of the TPU films is that of increasing the adhesion between the outer layers D and the layer P, or the layer O, respectively. (FIG. 6).

The outer layers comprising at least one thermoplastic and also the further transparent layers comprising at least one thermoplastic in the multilayer assembly of the window are preferably layers comprising at least one polycarbonate or copolycarbonate.

The inventive document of security and/or value is preferably a document of identification, preferably an identity card (ID card), such as, for example, a personal identity card, passport, driving license, bank card, credit card, insurance card, other identity card, etc.

The inventive document of security and/or value may preferably have an overall thickness of 150 µm to 1500 µm, more preferably of 500 µm to 1000 µm.

In addition to the layers specified above, the inventive document of security and/or value may have further thermoplastic polymer layers, preferably layers comprising at least one polycarbonate or copolycarbonate.

The inventive documents of security and/or value can be produced in a simple way by laminating a corresponding layer stack to form the multilayer assembly.

Further provided by the present invention, therefore, is a method for producing an inventive document of security and/or value, characterized in that a) a recess is incorporated into a single- or multilayer base body for a document of security and/or value,
b) incorporated into the recess is a multilayer assembly which is trimmed to match the recess and comprises
   at least one layer (P) comprising at least one photopolymer and incorporating at least one hologram (H), and
   at least one transparent, optically switchable layer (O) which becomes non-transparent by means of heat or irradiation, c) the arrangement obtained according to b) is placed between at least two transparent films comprising at least one thermoplastic, said films being two-dimensionally at least the same size as the arrangement obtained according to b), d) the arrangement obtained according to c) is laminated.

In one preferred embodiment of the method of the invention, the multilayer assembly incorporated into the recess in b) further comprises at least one further transparent layer (S) comprising at least one thermoplastic, and is produced by
- from a photopolymer formulation, applying the layer (P) to a substrate film which forms the layer (S), the layer (S) consisting preferably of polycarbonate and/or of the same material as the card body,
- incorporating the hologram (H) into this layer (P)
- subsequently placing a polymeric film onto the layer (P), for producing the layer (O)
- optionally placing a further transparent polymeric film onto the polymeric film for producing the layer (O), for producing a further transparent layer
- laminating the resulting film stack to form a multilayer assembly and
- subsequently, from the laminate, punching or cutting out a part matching the recess.

The invention is illustrated more closely below by means of examples.

In the drawings

FIG. 1 shows in diagrammatic representation a film coating line for producing photopolymer films. In the figure the individual components the following reference numerals:

Figure 2:
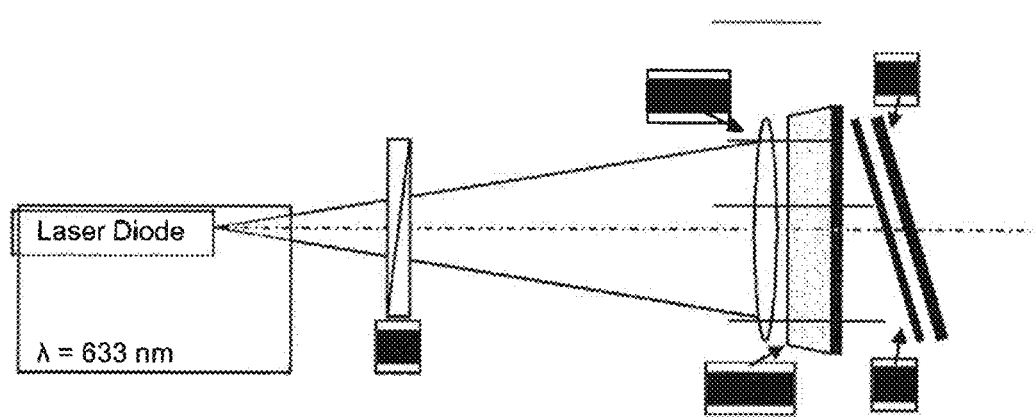
FIG. 2 shows a diagrammatic representation of an apparatus for generating a hologram in a photopolymer film for an exposure wavelengths of 633 nm (red)

1 reservoir container
2 metering device
3 vacuum degassing device
4 filter
5 static mixer
6 coating device
7 forced-air dryer
8 carrier substrate
9 liner layer The function of the line is described in the section "Production of holographic media on a film coating line". FIG. 2 shows an apparatus for generating a hologram in a photopolymer film for an exposure wavelengths of 633 nm (red). The function of the apparatus is described in the section "Production of reflection holograms in the photopolymer".

Figure 3:
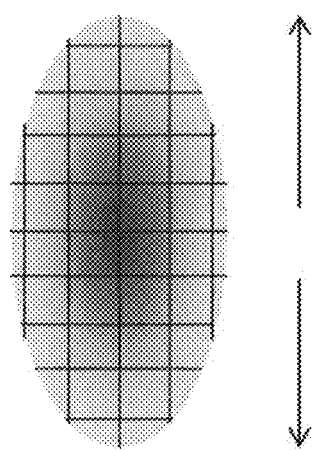
FIG. 3 shows the elliptical form of a hologram written using the apparatus of FIG. 2.

FIG. 3 shows by way of example a hologram generated using the apparatus of FIG. 2.

Figure 4:
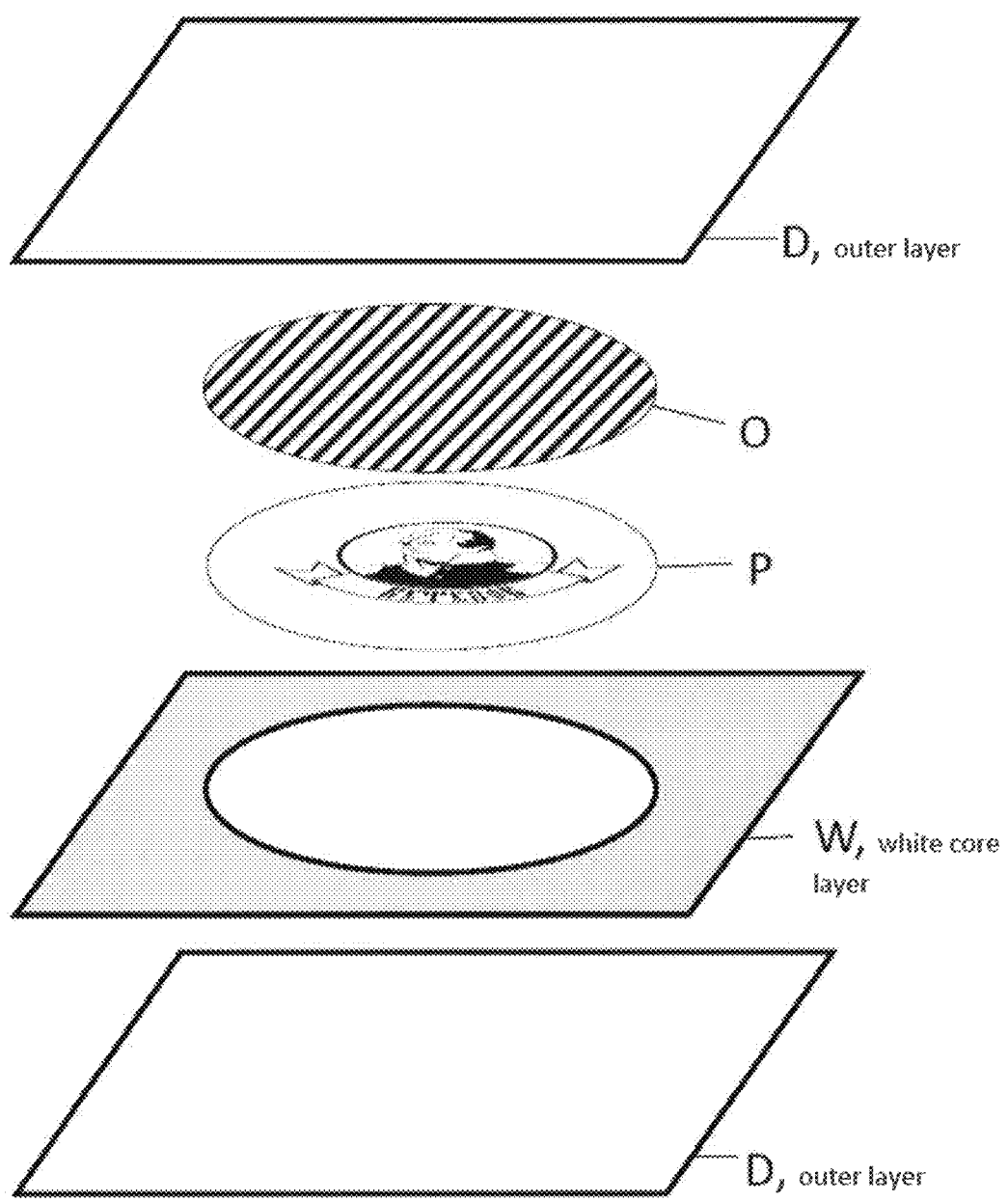
FIG. 4 shows a diagrammatic representation of a first inventive security document.

Represented diagrammatically in FIG. 4 is a first inventive security document. This document comprises two outer layers (D), a white core layer (W), a photopolymer layer (P) and a transparent, optically switchable layer (O). The two outer layers (D) are of transparent design. Incorporated by exposure in the photopolymer layer (P) is a hologram.

Disposed between the outer layers (D) is the white core layer (K), which has an oval recess. Disposed in the recess are the photopolymer layer (P) and the optically switchable layer (O). The layers are laminated to one another.

Figure 5:
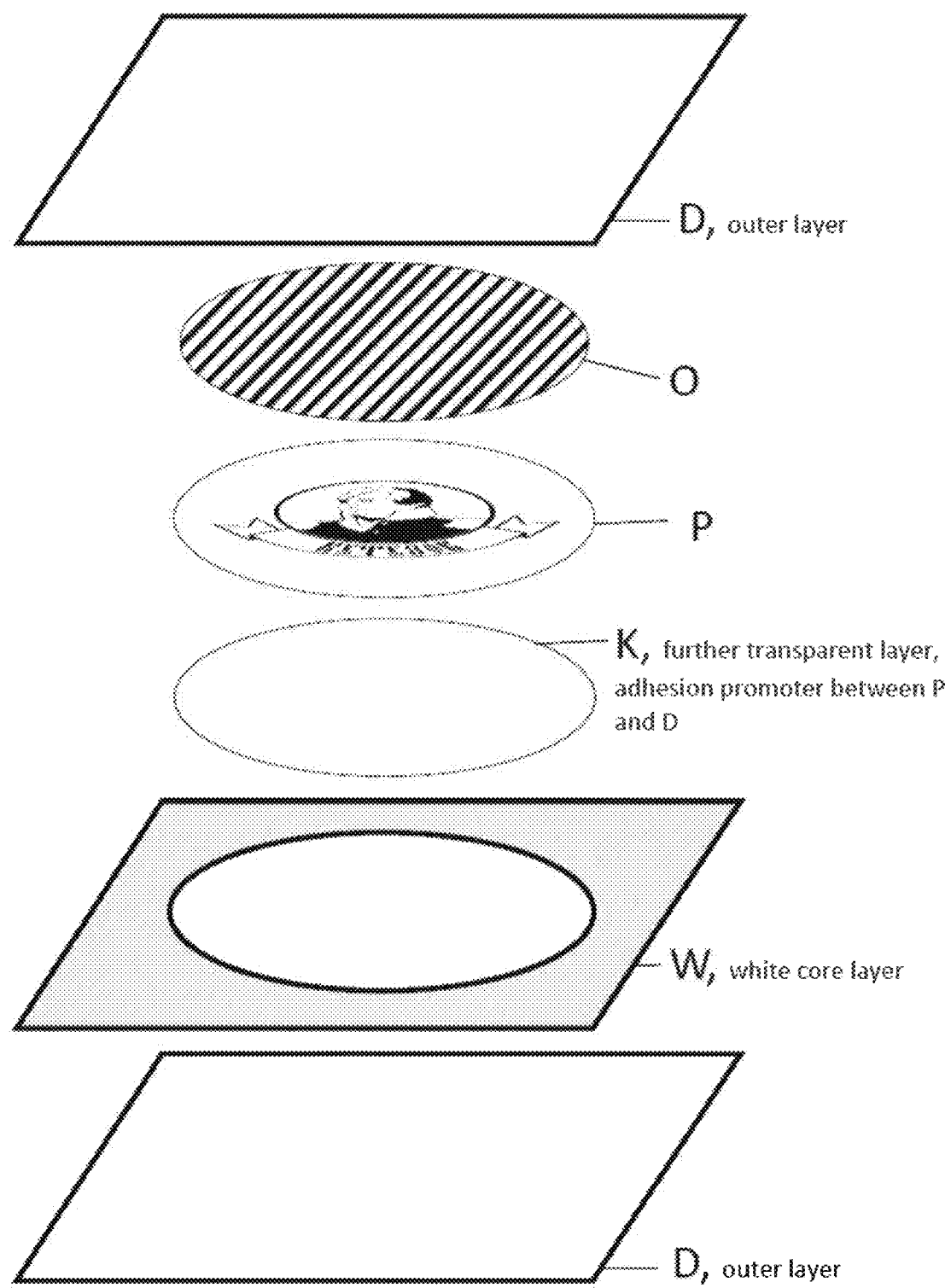
FIG. 5 shows a diagrammatic representation of a second inventive security document.

FIG. 5 shows a further inventive security document. Differing from the exemplary embodiment in FIG. 4, this document also has a further transparent layer (K), which in the drawing is disposed below the photopolymer layer (P) in the recess in the white core layer (K). The effect of the layer (K) is to improve adhesion between the photopolymer layer (P) and the bottom outer layer (D).

Figure 6:
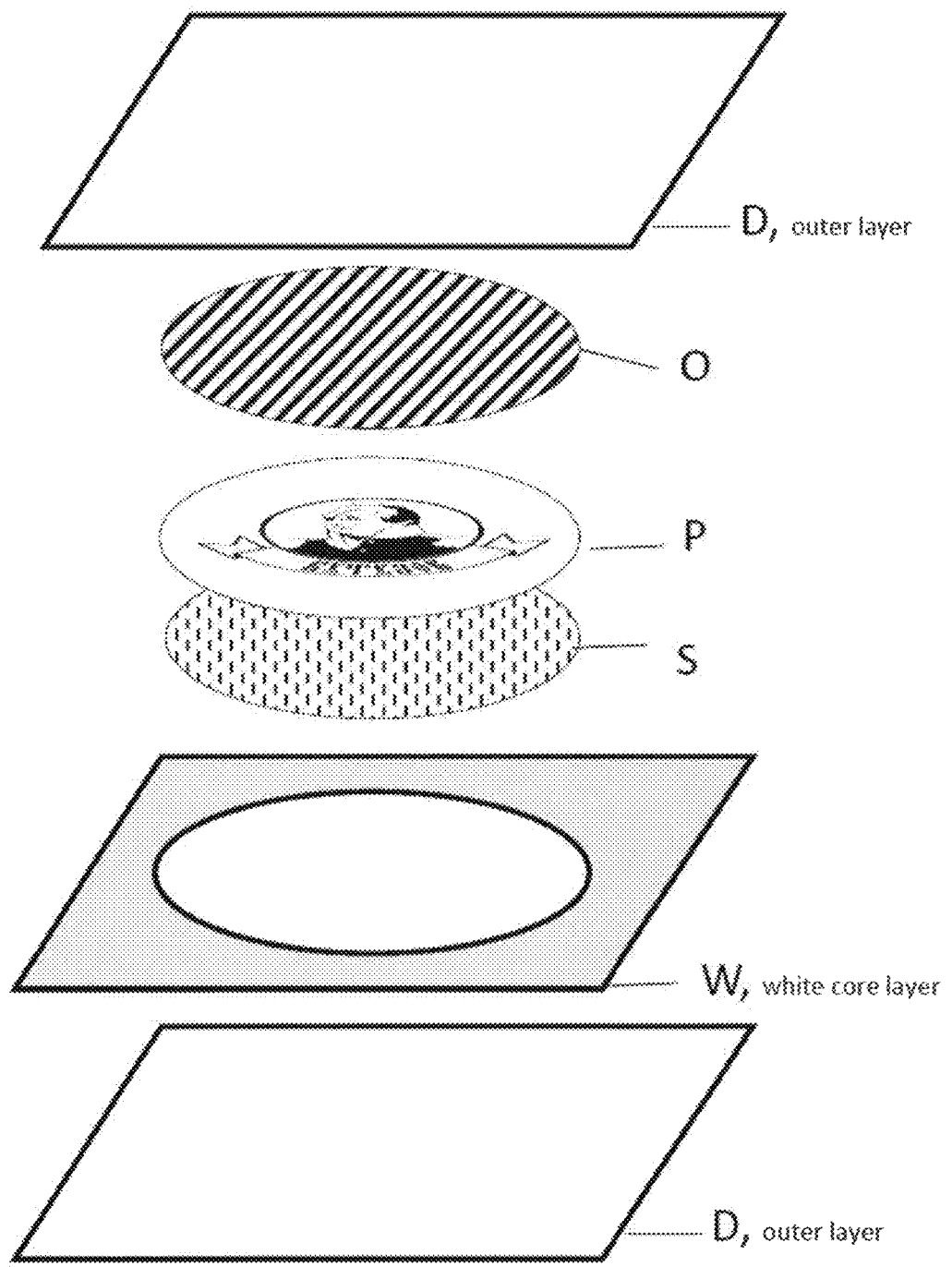
FIG. 6 shows a diagrammatic representation of a third inventive security document.

FIG. 6 again shows an embodiment of an inventive security document, in which, additionally, a substrate layer (S) is present. In the drawing this layer is disposed below the photopolymer layer (P) in the recess in the white core layer (K).

Figure 7:
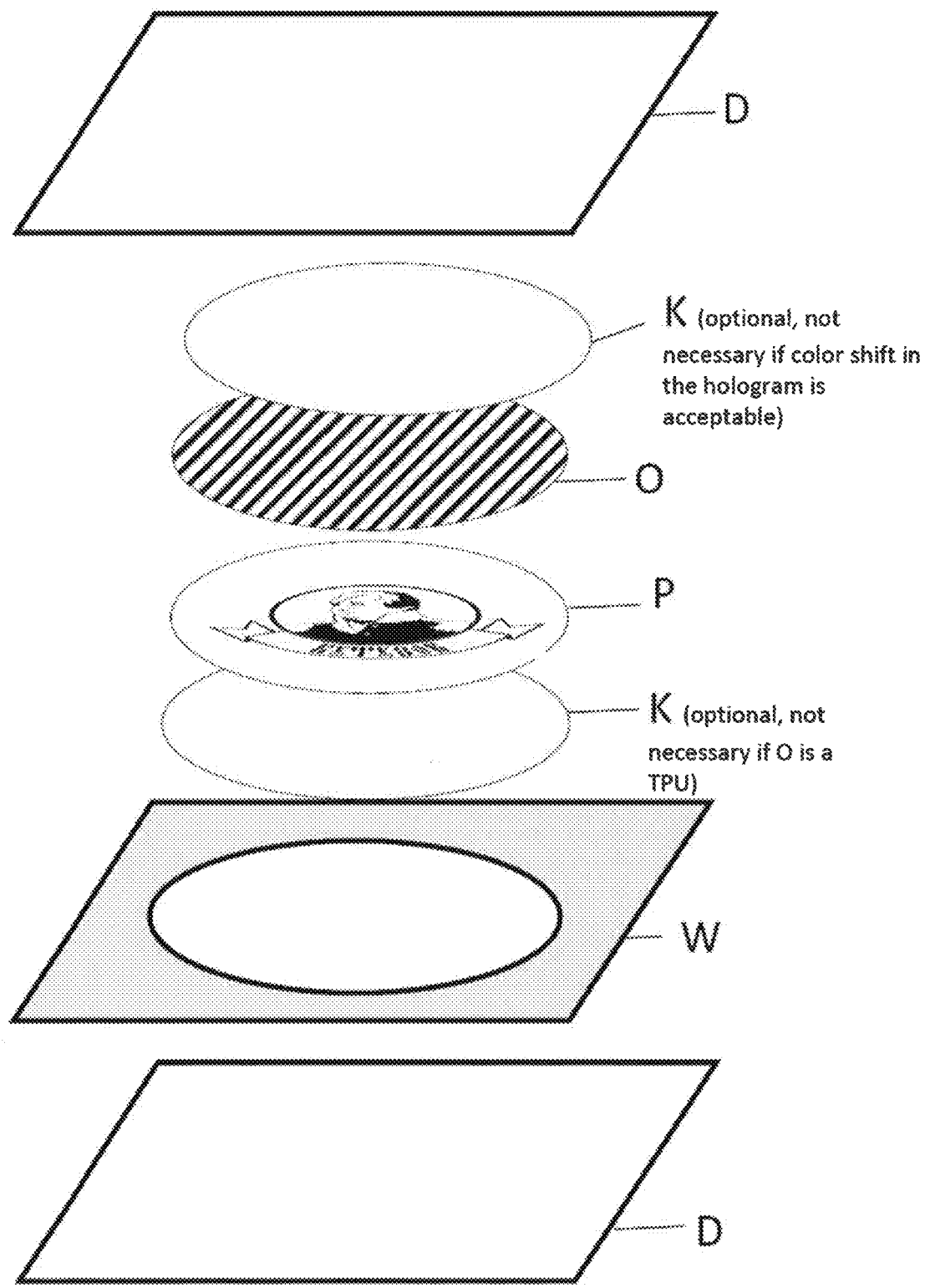
FIG. 7 shows a diagrammatic representation of a fourth inventive security document.

FIG. 7, lastly, represents yet another embodiment of an inventive security document. Additionally to the embodiment of FIG. 5, this document also comprises a further transparent layer (K), which in the drawing is disposed above the transparent, optically switchable layer (O) in the recess in the white core layer.

EXAMPLES

Films Used

Film 1 (D): Makrofol® ID 6-2, transparent polycarbonate film, one side—matt (6) one side finely matt (2nd side); 300 μm thickness (from Bayer MaterialScience AG).

Film 2 (O): Texin® DP7-3007 is a commercial product of Bayer MaterialScience LLC, Deerfield, USA (transparent TPU film, 100 μm thickness, containing UV-photochromic pigment).

Film 3 (P+S): photopolymer layer comprising a volume reflection hologram. This layer is a transparent polycarbonate carrier film coated with a photopolymer layer produced as described below, with an overall layer thickness of 143 μm (from Bayer MaterialScience AG). Incorporated by exposure into the photopolymer layer, as described below, is a volume reflection hologram.

Film 4 (W): Makrofol® ID 44-010207, white polycarbonate film, 240 μm thickness (from Bayer MaterialScience AG). The film thickness of 4 ought to correspond approximately to the overall thickness of films 2 and 3, since 2 and 3 are used to produce, by punching, film sections which are placed into the recess in 4.

Film 5 (D):

Makrofol® ID 6-2, transparent polycarbonate film, one side—matt (6), one side finely matt (2nd side); 300 μm thickness (from Bayer MaterialScience AG).

Photopolymer film produced as described below under Production of holographic media on a film coating line.

Materials Used for the Holographic Media:

Component D: Fascat 4102 0.07%, urethanization catalyst, butyltin tris(2-ethylhexanoate), product of Arkema GmbH, Düsseldorf, Germany.

Byk® 310 (silicone-based surface additive from BYK-Chemie GmbH, Wesel, 25% strength solution in xylene) 0.3%

Component E: C. I. Basic Blue 3 (converted to bis(2-ethylhexyl)sulphosuccinate salt) 0.26%, Safranin O (converted to bis(2-ethylhexyl)sulphosuccinate salt) 0.13% and Astrazon Orange G (converted to bis(2-ethylhexyl)sulphosuccinate salt) 0.13% with CGI 909 (experimental product from BASF SE, Basel, Switzerland) 1.5%, dissolved as solution in 5.8% ethyl acetate. Percentages are based on the overall formulation of the medium.

Component F: ethyl acetate (CAS No. 141-78-6).

Component G: Desmodur® N 3900, commercial product of Bayer MaterialScience AG, Leverkusen, Germany, hexane diisocyanate-based polyisocyanate, iminooxadiazinedione fraction at least 30%, NCO content: 23.5%.

Carrier substrate: Makrofol® DE 1-1 CC 125 µm (Bayer MaterialScience AG, Leverkusen, Germany).

I. Preparation Procedures for Further Substances Used for the Holographic Photopolymer Film:

Preparation of Polyol Component B:

A 1 l flask was charged with 0.18 g of tin octoate, 374.8 g of ε-caprolactone and 374.8 g of a difunctional polytetrahydrofuran polyether polyol (equivalent weight 500 g/mol OH) and this initial charge was heated to 120° C. and maintained at that temperature until the solids content (fraction of the non-volatile constituents) was 99.5 wt % or more. It was then cooled to give the product as a waxy solid.

Preparation of writing monomer C1 (phosphorus thioyltris(oxy-4,1-phenyleneiminocarbonyloxyethane-2,1-diyl)triacrylate)

In a 500 ml round-bottomed flask, 0.1 g of 2,6-di-tert-butyl-4-methylphenol, 0.05 g of dibutyltin dilaurate (Desmorapid® Z, Bayer MaterialScience AG, Leverkusen, Germany) and also and 213.07 g of a 27% strength solution of tris(p-isocyanatophenyl) thiophosphate in ethyl acetate (Desmodur® RFE, product of Bayer MaterialScience AG, Leverkusen, Germany) were introduced and heated to 60° C. Then 42.37 g of 2-hydroxyethyl acrylate were added dropwise and the mixture was held further at 60° C. until the isocyanate content had dropped below 0.1%. This was followed by cooling and by complete removal of the ethyl acetate under reduced pressure. The product was obtained in the form of a partially crystalline solid.

Preparation of writing monomer C2 (2-({[3-(methylsulphanyl)phenyl]carbamoyl}oxy)ethyl prop-2-enoate)

In a 100 ml round-bottomed flask, 0.02 g of 2,6-di-tert-butyl-4-methylphenol, 0.01 g of Desmorapid® Z and 11.7 g of 3-(methylthio)phenyl isocyanate were introduced and introduced and heated to 60° C. Then 8.2 g of 2-hydroxyethyl acrylate were added dropwise and the mixture was held further at 60° C. until the isocyanate content had dropped below 0.1%. This was followed by cooling. The product was obtained in the form of a pale yellow liquid.

Preparation of the additive (bis(2,2,3,3,4,4,5,5,6,6,7,7-dodecafluoroheptyl)(2,2,4-trimethylhexane-1,6-diyl)biscarbamate)

In a 2000 ml round-bottomed flask, 0.02 g of Desmorapid® Z and 3.60 g of 2,4,4-trimethylhexane 1,6-diisocyanate (TMDI) were introduced and heated to 70° C. Then 11.39 g of 2,2,3,3,4,4,5,5,6,6,7,7-dodecafluoroheptan-1-ol were added dropwise and the mixture was held further at 70° C. until the isocyanate content had dropped below 0.1%. This was followed by cooling. The product was obtained in the form of a colourless oil.

II. Production of Holographic Media on a Film Coating Line

Figure 1:
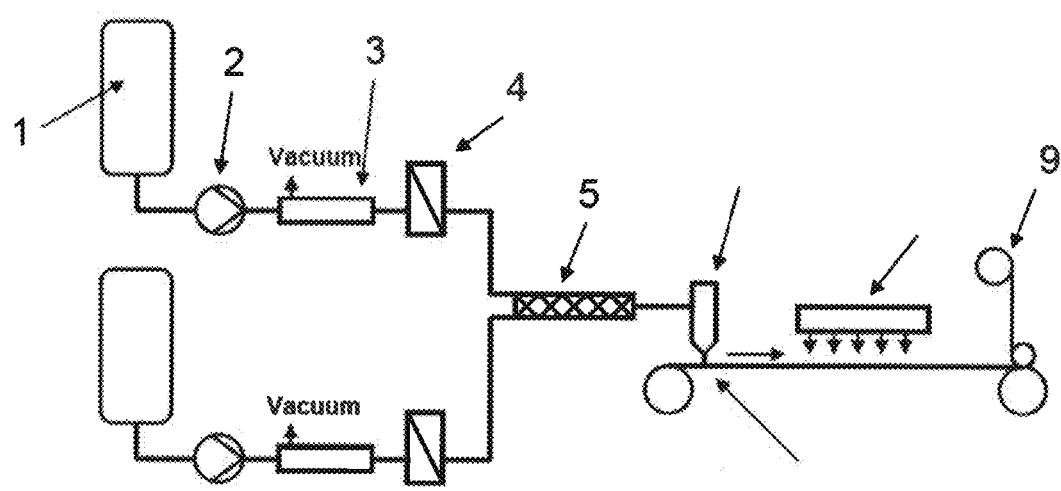
FIG. 1 shows a diagrammatic representation of a film coating line for producing a photopolymer film.

Described below is the continuous production of holographic media in the form of films from photopolymer formulations on the line of FIG. 1.

To produce the photopolymer formulation, 304.3 g of component B (polyol) in a stirring vessel were admixed in steps with a writing monomer mixture of 138 g of C1 and 138 g of C2, with 191 g of additive, 0.60 g of component D, 2.55 g of BYK® 310 and 101 g of component F, and these components were mixed. Then 66.5 g of component E were added to the mixture in the dark and the composition was mixed so as to give a clear solution. If necessary, the formulation was heated at 60° C. for a short time in order to bring the ingredients into solution more rapidly. This mixture was introduced into one of the two reservoir containers 1 of the coating line. Introduced into the second reservoir container 1 was component A (polyisocyanate). Both components were then conveyed to the vacuum degassing device 3, in each case by the metering devices 2, in a ratio of 942.2 to 57.8, and degassing was carried out. From there, they were then each passed through the filter 4 into the static mixer 5, where the mixing of the components to give the photopolymer formulation took place. The liquid material obtained was then supplied in the dark to the coating device 6.

The coating device 6 in the present case is a slot die, with which the skilled person is familiar. Alternatively, however, it is also possible for a doctor blade system to be employed. Using the coating device 6, the photopolymer formulation was applied at a processing temperature of 20° C. to a carrier substrate (Makrofol 1-1 DE, 125 µm) and dried in a forced-air dryer 7 for 5.8 minutes at a crosslinking temperature of 80° C. This gave a medium in the form of a film, which was then provided with a polyethylene film liner layer 9, 40 µm thick, and was wound up.

The layer thickness obtained in the film was 18 µm.

III. Production of Reflection Holograms in the Photopolymer:

The measurement setup of FIG. 2 was used to introduce a hologram by exposure into the holographic medium of II. These holograms were monochromatic holograms with a 633 nm laser wavelength. To produce them, sections of the film were cut off in the dark, the lining film was removed, and the films were laminated bubble-free with the photopolymer side downwards onto a glass of size 50×75 mm and thickness 1 mm. The glasses used were Corning glasses from Schott AG, Mainz, Germany.

The beam of a laser (emission wavelength 633 nm) is expanded to a diameter of ~3-4 cm by means of an optional expansion lens (AF) and the collimating lens (CL), which is positioned after the shutter S. The diameter of the expanded laser beam is determined in this case by the aperture of the opened shutter. A non-uniform intensity distribution is deliberately ensured in the expanded laser beam. Accordingly, the edge intensity $P_R$ is ~only half the intensity $P_Z$ in the centre of the expanded laser beam. P is to be understood here as power/area. The expanded laser beam first passes through a glass plate set up at an oblique angle to the beam, serving as a shearing plate (SP). On the basis of the upwardly reflected interference pattern generated by the two glass surface reflections of the SP, it is possible to ascertain whether the laser is emitting stably in single mode. In that case of dark and light stripes can be seen on a matt panel placed above the SP. Only if emission is in single mode are holographic exposures performed. In the case of the DPSS laser, the single mode can be achieved by adjustment of the pump flow. The expanded beam passes through the holographic medium (P), set up at an oblique angle of approximately 15°—this part forms the reference beam—before being then reflected back into P by the object (O) arranged parallel to P. This part then forms the signal beam of the Denisyuk arrangement.

The interference of signal beam and reference beam in P generates the hologram in the holographic medium. O consists of a metal plate covered with white paper, with the paper side P facing forward. Located on the paper is a square grid produced by black lines. The edge length of one square is 0.5 cm. This grid is imaged as well in the hologram during the holographic exposure of P.

The average exposure dose $E_{ave}$ is set through the opening time t of S. For a fixed laser power I, therefore, t represents the parameter proportional to $E_{ave}$. Since the intensity distribution of the expanded laser beam is non-uniform (bell-shaped), there is variation in the local dose E for generating the hologram in P. Together with the oblique placement of P and O with respect to the optical axis this leads the written hologram to possess an elliptical form, as shown in FIG. 5.

Given that O is a diffuse reflector, the hologram is easily reconstructed by illumination with a point light source (e.g. pocket lamp or LED lamp).

IV. Production of a Security Document:

a) The security document produced is shown in FIG. 4 and was produced as follows: the following film sheets were laminated using a 470 LSI roll laminator from GMP Laminart. Chosen laminating temperature: 120° C., laminating speed 2.4 m/min:

Film 2 (O)

Film 3 (P+S) with the photopolymer coating in contact with film 2.

b) A circular film section including the hologram incorporated by exposure was punched from the laminated film construction from a).

c) Subsequently a recess matching the shape of the film section from b) was punched in the film 4 (W). The film section produced under b) was placed into the recess.

d) Placed onto the top and bottom faces of the arrangement from c) in each case was a transparent film which corresponded in its dimensions to those of the film 4 (W), in such a way that film 1 (TD) was in contact with the substrate side S of film 3, and film 5 (TD) was in contact with film 2 (O).

e) The arrangement from d) was joined under pressure and temperature to form a monolithic laminate. Lamination was carried out using a card laminating press from Bürckle. The laminating temperature was set at 190° C. and the pressure at 240 N/cm². The pressing time at 190° C. was 4 minutes. This was followed by cooling for 15 minutes. The laminate was taken from the press at a temperature of 38° C.

When the completed laminate was viewed, a transparent window joined seamlessly to the remainder of the laminate was visible in the region of the film section from b). When the window was viewed under normal room light, the hologram was apparent only very faintly. When the window is illuminated with a WF 501 B UV pocket lamp from Ultrafire, the window darkens and the visibility of the hologram has been significantly improved. In the optically switched, darkened state, the hologram could be seen only from the side from which it faced directly towards the viewer, in other words on being viewed through the film 1. From the other side, with direct viewing onto the film 3, the hologram was not visible. A few minutes after the UV irradiation, the photochromic effect lapsed and the window was transparent again.

The invention claimed is:

1. A hot laminated document of security and/or value, comprising at least one window, the window being formed from a multilayer assembly, wherein the multilayer assembly comprises
   at least one layer (P) comprising at least one photopolymer prepared from a photopolymer formulation comprising a polyol component, a polyisocyanate component, a writing monomer and a photoinitiator and incorporating at least one volume hologram (H) and
   at least one transparent, optically switchable layer (O) which becomes non-transparent by means of heat or irradiation, wherein the transparent, optically switchable layer (O) is a layer of at least of at least one transparent thermoplastic polyurethane comprising at least one photochromic or thermochromic material or composition.

2. The hot laminated document of security and/or value as claimed in claim 1, wherein the photopolymer formulation further comprises an additive, preferably an additive according to the general formula (III)

in which m≥1 and m≤8 and $R^3$, $R^4$ and $R^5$ independently of one another are hydrogen or are linear, branched, cyclic or heterocyclic organic radicals which are unsubstituted or else optionally substituted by heteroatoms, at least one of the radicals $R^3$, $R^4$ and $R^5$ preferably being substituted by at least one fluorine atom, and $R^3$ more preferably being an organic radical having at least one fluorine atom.

3. The hot laminated document of security and/or value as claimed in claim 1, wherein the writing monomer in the photopolymer formulation comprises at least one monofunctional and/or one multifunctional urethane (meth)acrylate.

4. The hot laminated document of security and/or value as claimed in claim 1, wherein it is a document of identification, preferably an ID card.

5. The hot laminated document of security and/or value as claimed in claim 1, wherein the window is incorporated in the document of security and/or value in such a way that the remaining inner part of the document and the window are located between at least two transparent outer layers which comprise at least one thermoplastic and which two-dimensionally each cover the entire document.

6. The hot laminated document of security and/or value as claimed in claim 5, wherein the outer layers comprising at least one thermoplastic and the further transparent layers comprising at least one thermoplastic in the multilayer assembly of the window are layers comprising at least one polycarbonate or copolycarbonate.

7. The hot laminated document of security and/or value as claimed in claim 1, wherein the window comprises at least one further transparent layer which comprises at least one thermoplastic and is located on the side of the layer P that is remote from the layer O.

8. The hot laminated document of security and/or value as claimed in claim 1, wherein the window comprises at least two further transparent layers comprising at least one thermoplastic, of which one is located on the side of the layer P that is remote from the layer O and the other is located on the side of the layer O that is remote from the layer P.

9. The hot laminated document of security and/or value as claimed in claim 1, wherein the hologram in one state is poorly visible, and the window is virtually transparent, and wherein, in another state, the hologram is clearly apparent.

10. A method for producing a hot laminated document of security and/or value as claimed in claim 1, comprising
a) incorporating a recess into a single- or multilayer base body for a document of security and/or value,
b) incorporating into the recess a multilayer assembly which is trimmed to match the recess and comprises
   at least one layer (P) comprising at least one photopolymer and incorporating at least one volume hologram (H), and
   at least one transparent, optically switchable layer (O) which becomes non-transparent by means of heat or irradiation,
c) using heat and pressure placing the arrangement according to b) between at least two transparent films which two-dimensionally are of at least equal size and comprise at least one thermoplastic, and
d) laminating the arrangement obtained according to c).

11. The method as claimed in claim 10, wherein the multilayer assembly incorporated into the recess in b) further comprises at least one further transparent layer (S) comprising at least one thermoplastic, and is produced by
from a photopolymer formulation, applying the layer (P) to a substrate film which forms the layer (S)
incorporating the volume hologram (H) into this layer (P)
subsequently placing a polymeric film onto the layer (P), for producing the layer (O)
optionally placing a further transparent polymeric film onto the polymeric film for producing the layer (O), for producing a further transparent layer
laminating the resulting film stack using heat and pressure to form a multilayer assembly and
subsequently, from the laminate, punching or cutting out a part matching the recess.

12. A hot laminated document of security and/or value, comprising at least one window, the window being formed from a multilayer assembly, wherein the multilayer assembly consists of
a layer (P) comprising at least one photopolymer prepared from a photopolymer formulation comprising a polyol component, a polyisocyanate component, a writing monomer and a photoinitiator and incorporating at least one volume hologram (H) and
a transparent, optically switchable layer (O) which becomes non-transparent by means of heat or irradiation, wherein the transparent, optically switchable layer (O) is a layer of at least of at least one transparent thermoplastic polyurethane comprising at least one photochromic or thermochromic material or composition,
a transparent thermoplastic polyurethane film (K), which is located on the side of the layer (P) that is remote from the layer (O), and optionally a further transparent thermoplastic polyurethane film (K), which is located on the side of the layer (O) that is remote from the layer (P),
two transparent outer layers (D),
and a white core layer (W) having a recess, and wherein the multilayer assembly is disposed within the recess, and
wherein the window is incorporated in the document of security and/or value in such a way that the remaining inner part of the document and the window are located between the two transparent outer layers (D) which comprise at least one thermoplastic and which two-dimensionally each cover the entire document.

13. The hot laminated document of security and/or value as claimed in claim 12 having a thickness of from 500 μm to 1000 μm.

* * * * *